US005550566A

United States Patent [19]

Hodgson et al.

[11] Patent Number: 5,550,566
[45] Date of Patent: Aug. 27, 1996

[54] VIDEO CAPTURE EXPANSION CARD

[75] Inventors: David O. Hodgson, San Mateo; Daniel B. Gochnauer, Saratoga, both of Calif.

[73] Assignee: Media Vision, Inc., Fremont, Calif.

[21] Appl. No.: 92,152

[22] Filed: Jul. 15, 1993

[51] Int. Cl.⁶ .................................................. G09G 5/00
[52] U.S. Cl. ............................................ 345/202; 345/185
[58] Field of Search ........................................ 345/120, 121, 345/202, 203, 131, 196, 185; 382/54, 232; 348/50, 589, 397, 398; 395/162, 325

[56] References Cited

U.S. PATENT DOCUMENTS

| | | | |
|---|---|---|---|
| 4,153,896 | 5/1979 | White | 345/131 |
| 4,956,705 | 9/1990 | Wright | 348/50 |
| 4,992,782 | 2/1991 | Sakamoto et al. | 345/202 |
| 4,996,598 | 2/1991 | Hara | 348/589 |
| 5,241,631 | 8/1993 | Smith et al. | 395/325 |
| 5,266,805 | 11/1993 | Edgar | 382/54 |
| 5,404,445 | 4/1995 | Matsumoto | 395/162 |

*Primary Examiner*—Richard Hjerpe
*Assistant Examiner*—Regina Liang
*Attorney, Agent, or Firm*—Claude A. S. Hamrick; Emil C. Chang

[57] ABSTRACT

An expansion card for a personal computer digitizes, optionally processes and/or compresses, stores, and then relays to the personal computer video information without the use of a frame store memory. An analog-to-digital converter on the expansion card digitizes at least part of a frame of an analog video signal received on a video connector of the expansion card. After optional processing and/or compressing of the digitized video information of the frame, part of the digitized video information is stored into a relatively small memory on the expansion card. Once stored, the digitized video information is transferred from the memory and to the personal computer over a parallel bus of the personal computer. Another part of the digitized video information of the frame is then stored into the same memory on the expansion card for subsequent transfer to the personal computer over the parallel bus. The memory provided on the video capture expansion card therefore has a smaller storage capacity than would be necessary otherwise if all the digitized video information of the frame which is to be stored were held at one time stored in a frame store memory.

13 Claims, 25 Drawing Sheets

→ FIRST HALF-FRAME TRACE
--→-- SECOND HALF-FRAME TRACE
—— RETRACE

VIDEO CAPTURE EXPANSION CARD

FIELD OF THE INVENTION

This invention relates to capturing video signals. More particularly, this invention relates to expansion cards for personal computers which capture video information.

BACKGROUND OF THE INVENTION

FIG. 1 (PRIOR ART) is a representation of an analog signal containing video information according to the RS170A video signal standard. FIG. 2 (PRIOR ART) is a simplified view of the screen of a cathode ray tube 20 (CRT) upon which video information contained in the signal of FIG. 1 is displayed. A first vertical blanking pulse 10 of the analog signal shown in FIG. 1 causes an electron beam in the CRT to be blanked out while synchronization pulse 10a causes the beam to be positioned at the upper left corner of the CRT. After the vertical blanking pulse 10, the electron beam is swept from left to right across the screen in a slightly downward path as indicated by line L1 in FIG. 2. Video information 11 for line L1 is contained between the end of the first vertical blanking pulse 10 and the beginning of a first horizontal blanking pulse 12. After the electron beam reaches the right edge of the screen, the first horizontal blanking 12 pulse causes the beam to be blanked while horizontal synchronization pulse 12a causes the beam to move from right to left back to the far left of the screen. At the end of the first horizontal blanking pulse 12, the beam again sweeps from left to right in a slightly downward path along line L2 across the screen. Video information 13 for the second line L2 is located between the first horizontal blanking pulse 12 and a second horizontal blanking pulse 14. Once the beam arrives at the right edge of the screen, a second horizontal synchronization pulse 14a causes the beam to be moved to the left edge of the screen. This sequence of writing successive lines of video information onto the screen is repeated until midway through line L262. A second vertical blanking pulse 15 then causes the beam to be blanked and moved to point P262.5 at the center of the top edge of the screen. The remainder of line L262 of video information is then swept across to the right edge of the screen. Successive horizontal synchronization pulses (not shown) which occur after second vertical blanking pulse 15 repeatedly blank and return the beam to the left edge of the screen until lines L263–L525 have been interlaced with lines L1–L262 on the screen. According to the RS170A standard, 525 lines of video information constitute one "frame" of video information. Transmission standards other than the RS170A standard may have frames with more or fewer lines of video information.

Some prior art devices store a frame of digitized video information in a memory called a frame store memory. These prior art devices typically digitize incoming video information and then store the video information, line by line, into the frame store memory until all the desired video information from the frame is stored in the frame store memory. Once stored, the frame of video information may be read out of the frame store. Although such prior art video capture devices may function in their intended applications, such prior art devices tend to be costly due to the provision of a frame store memory with the capacity to store all the video information pertaining to one or more frames.

SUMMARY OF THE INVENTION

A video capture expansion card for a personal computer is disclosed which does not simultaneously store all the video information of one frame. Rather, the video capture expansion card of the present invention comprises a memory into which video information from a first part of a frame of video information is stored. After the stored video information is read out of the memory and onto a parallel bus of the personal computer, video information from a second part of the frame is stored into the memory. The stored video information from the second part of the frame is then read out of the memory and onto the parallel bus. Accordingly, the video capture expansion card does not use a frame store memory which simultaneously holds all the video information pertaining to a frame.

In one embodiment of the present invention, the video capture expansion card comprises: a printed circuit card having an extension which detachably mates with a card edge connector of a parallel bus of a personal computer; two video connectors for receiving video signals; a 2-to-1 selector for conducting one of the video signals received to a video decoder, such as RGB decoder, a YUV decoder, or a YIG decoder; the video decoder for decoding the video signal received from the 2-to-1 selector into analog signals representing color components of an image; analog-to-digital converters to convert the color analog signals into separate streams of digital samples; a horizontal compressor for optionally compressing the streams of digital samples into streams having fewer digital values; a pair of first-in-first-out (FIFO) memories for storing portions of the streams from the horizontal compressor; a vertical compressor for optionally combining digital values from the two FIFO memories; a bus interface for controlling data flow from the vertical compressor to the parallel bus of the personal computer and between the parallel bus of the personal computer and a microcontroller; a microcontroller and control circuitry for configuring and controlling the operation of the expansion card and also for controlling which portions of the video signal are captured; switches for setting the address of the expansion card on the parallel bus; and an RS-422 serial port connector for optionally controlling a video cassette recorder (VCR) or other video device from the expansion card.

The expansion card may, for example, be configured so that each line of an incoming video signal is digitized into three sample streams, one for red, one for green, and one for blue, each stream containing 640 digital 6 bit samples. The horizontal compressor may be configured to leave the sample streams unaltered or to compress the sample streams. If uncompressed, the resulting digitized image can be 640 pixels wide.

Compression includes both a reversible processes where a data stream is reduced in size without loss of information and an irreversible processes where information is sacrificed to reduce size. For example, the horizontal compressor may be configured to average together each successive four of the digital samples in a stream so that each successive four digital samples are reduced to a single digital value. Information is lost as each stream of 640 digital samples is reduced to a stream of 160 digital values. In this configuration, successive digital values output from the horizontal compressor are written into a FIFO line buffer memory. Once the FIFO line buffer memory has stored 160 digital values of each stream, subsequent digital values of the frame which are output by the horizontal compressor are written into a second FIFO line buffer memory. The digital values stored in the first line buffer memory can therefore be read out of the first FIFO line buffer memory and onto the parallel bus of the personal computer when subsequent digital values are being written into the second FIFO line buffer memory.

When the second FIFO line buffer memory contains 160 additional digital values from each stream, subsequent digital values from the horizontal compressor are again written into the first FIFO line buffer memory so that the second FIFO line buffer memory can output stored video data onto the parallel bus.

The video capture expansion card therefore stores first video information from a first part of a frame of video information into a memory. That first video information is then read out of the memory. Second video information from a second part of the frame is stored into substantially the same memory locations that the first video information previously occupied. If the storage capacity of the memory is small, for example a storage capacity of video information derived from only one, two, three or four video lines of the frame, a relatively inexpensive expansion card for a personal computer is realizable having a total memory capacity which is significantly smaller than the memory capacity of a conventional video capture device employing a frame store.

In operation, the personal computer may read the stored video data from the expansion card and into RAM via the parallel bus. Once in RAM, the personal computer can use software algorithms to compress the data and then can store the data onto a disk drive. In one embodiment about one quarter of the time is spent retrieving video data from the expansion card and about three quarters of the time is spent compressing the video data and storing it to disk. When the compressed data is to be displayed in the form of a picture on the screen such as a VGA screen of the personal computer, the compressed data is retrieved from the disk drive, is decompressed in software, and is displayed on the personal computer screen. In some embodiments, the compression for storage to disk may be done in hardware on the expansion card.

DETAILED DESCRIPTION OF THE PREFERRED EMBODIMENTS

Figure 1:
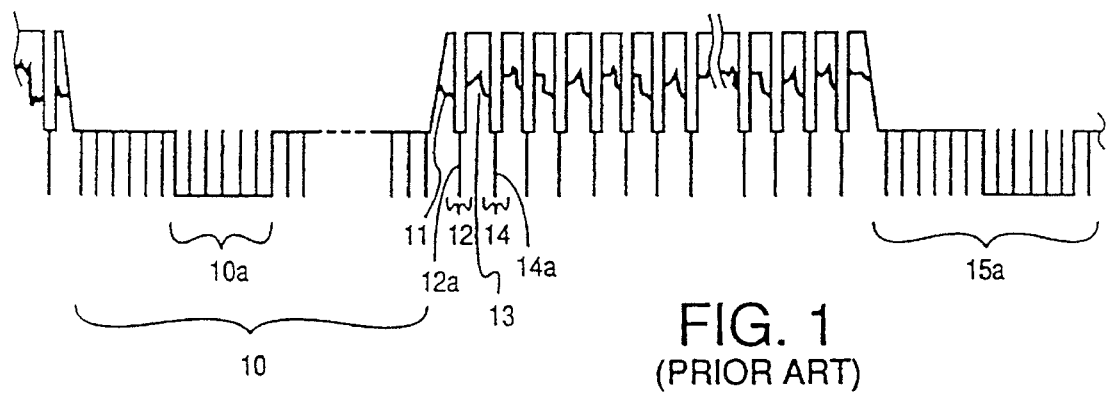
FIG. 1 (PRIOR ART) is a representation of an analog signal containing video information according to the RS170A standard.
Figure 2:
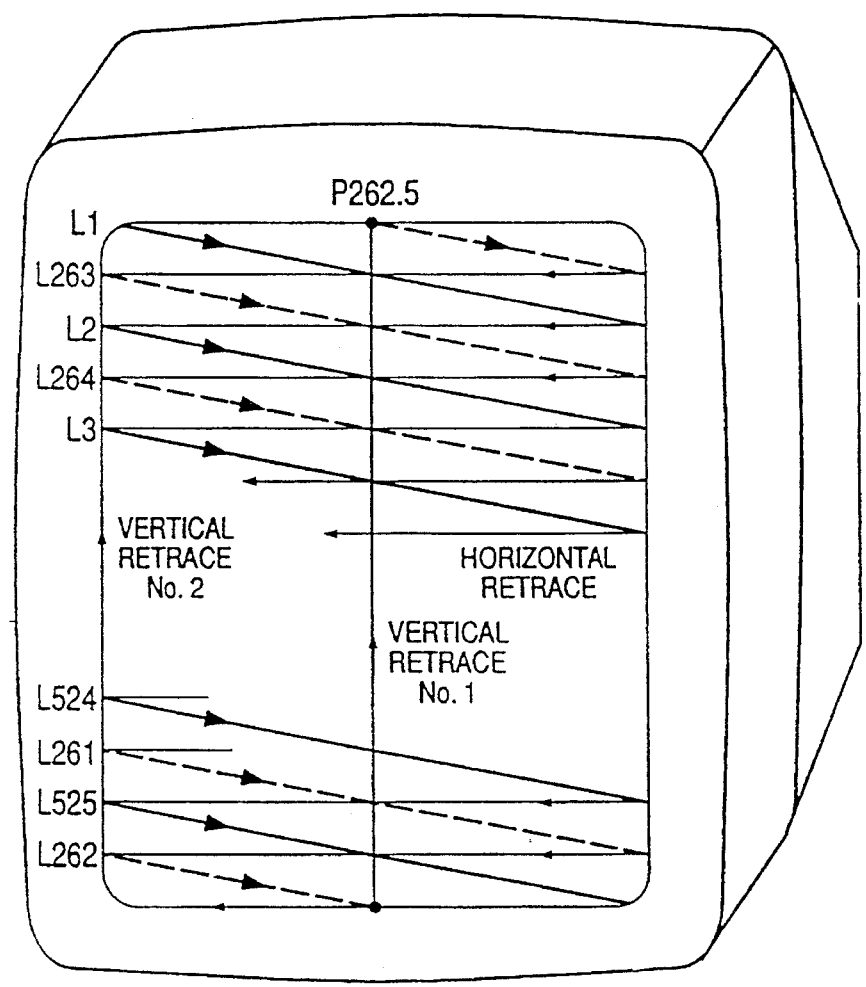
FIG. 2 (PRIOR ART) is a representation of how a frame of RS170A video information is displayed on a screen of a cathode ray tube.
Figure 3:
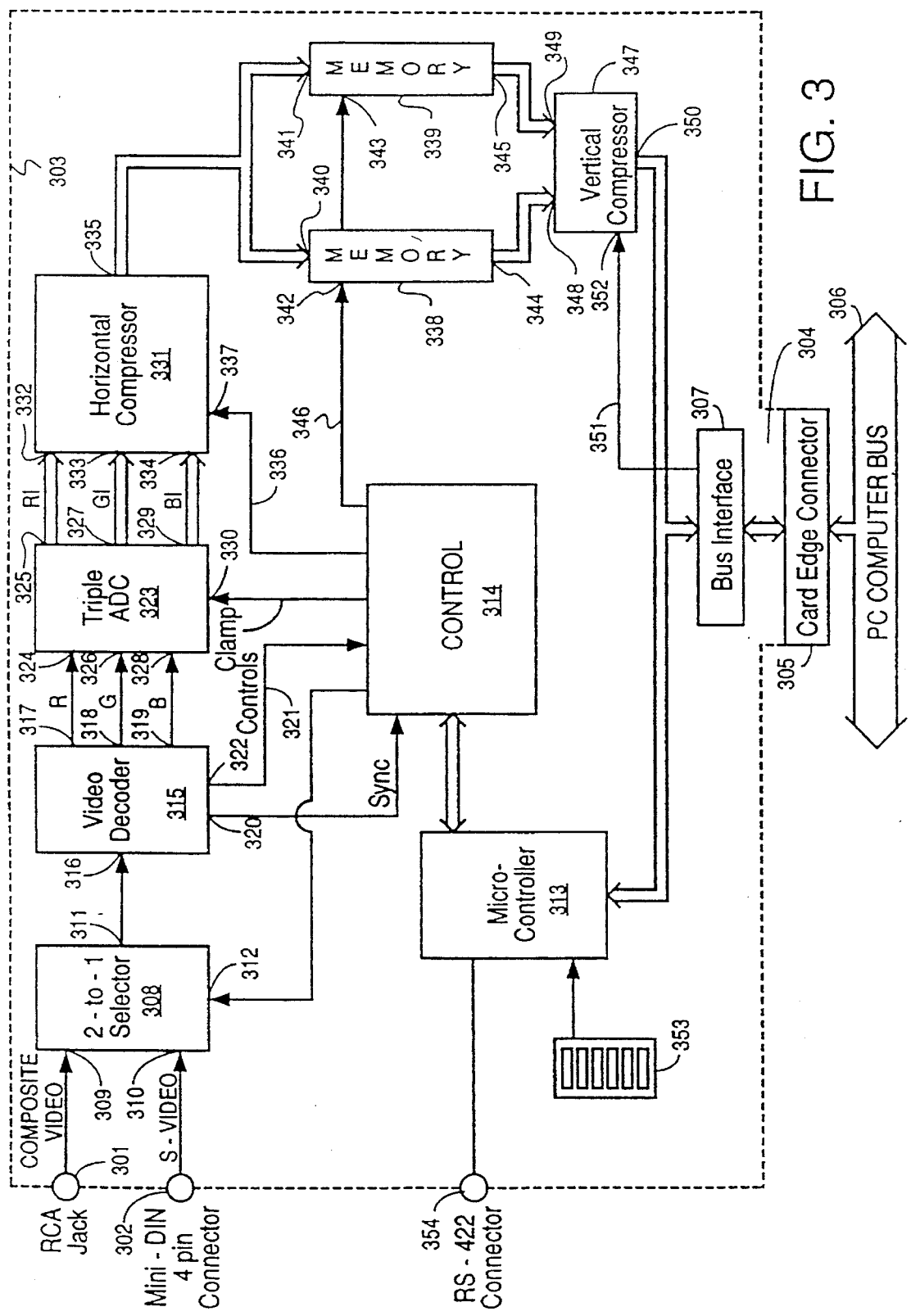
FIG. 3 is a block diagram of one embodiment of the video expansion card according to the present invention.

FIG. 3 is a block diagram of an embodiment in accordance with the present invention. Two video connectors, an RCA jack 301 and a mini-DIN 4-pin connector 302, are provided on a printed circuit board 303. A composite video signal is received on the RCA jack and a super-video (S-video) signal is received on the mini-DIN 4-pin connector. However, numerous other types of connectors may be employed to connect many different sources of video signals to the expansion card, and any number of video connectors may be employed including a single video connector. For example, DIN 7-pin connectors, F-connectors, BNC connectors, or European type connectors may be used. Video signals may be provided by many sources such as a camera, a video cassette recorder (VCR), or a laser disk, and may be in formats other than composite video and S-video.

In the embodiment of FIG. 3, the printed circuit board 303 has an extension 304 with metallized fingers. Extension 304 can be removably fitted into a card edge connector 305 of a parallel bus 306 of a personal computer. In some personal computers such as an IBM PC or an IBM PC compatible computer, a parallel bus and several associated card edge connectors such as connector 305 are usually disposed directly on the computer motherboard. The personal computer with which the expansion card communicates may also be a computer other than an IBM PC or an IBM PC compatible as long as the computer has a parallel bus suitable for communication with the expansion card. Parallel bus 306 may be any parallel bus of a personal computer. The parallel bus may, for example, be an ISA bus, an EISA bus, a VESA bus, or an MCA bus.

Extension 304 with metallized fingers is explained in connection with the embodiment of FIG. 3 because card edge connectors are the most common type of connectors provided in today's personal computers to accommodate expansion cards. Other types of connectors for connecting an expansion card to a parallel bus of a personal computer may be employed. The outer shape of printed circuit board 303 is fashioned to fit into the enclosure of the personal computer. When the printed circuit board 303 is fitted into card edge connector 305, signal lines of the parallel bus 306 of the personal computer are connected to bus interface circuitry 307 so that the personal computer can read from, and in some embodiments also write to, the expansion card.

A 2-to-1 selector 308 has two analog input leads 309 and 310, an analog output lead 311, and a select lead 312. 2-to-1 selector 308 receives a composite video signal from RCA jack 301 on input lead 309 and receives an S-video signal from mini-DIN 4-pin connector 302 on input lead 310. A microcontroller 313 via control circuitry 314 and select lead 312 determines which of the two analog video signals is supplied on analog output lead 311. The 2-to-1 selector 308 may, for example, be an analog switch. In the event that only one video connector is provided on the expansion card, the 2-to-1 selector 308 need not be provided.

In the embodiment of FIG. 3, a video decoder 315 is an RGB video decoder having an analog video input lead 316 and three analog outputs leads 317, 318 and 319. Video decoder 315 decodes the video signal received from output lead 311 of 2-to-1 selector 308 into three analog output signals: a red signal R, a green signal G, and a blue signal B. The video decoder 315 also provides on lead 320 a composite synchronization signal for control circuitry 314. Various control signals 321 for controlling the operation of video decoder 315 are supplied on input leads 322 by microcontroller 313 and control circuitry 314. Although video decoder 315 is shown as an RGB video decoder, video decoder 315 may be another type of video decoder such as a YUV decoder or a YIG decoder.

A triple analog-to-digital converter (ADC) 323 receives red signal R, green signal G, and blue signal B on analog input leads 324, 326, and 328, digitizes the signals R, G, and B into streams RI, GI, and BI of digital samples, and outputs streams RI, GI, and BI on output leads 325, 327, and 329 respectively. A combination of three digital samples, one from each of the digital streams RI, BI and GI, represents the color of a pixel in a digitized video image.

A horizontal compressor 331 has three sets of input leads 332, 333, and 334 which receive the three streams of digital samples RI, GI, and BI, respectively. Horizontal compressor 331 also has parallel output leads 335 and control leads 337. Output leads 335 include leads which carry a digital value corresponding to the red sample stream RI, leads which carry a digital value corresponding to the green sample stream GI, and leads which carry a digital value corresponding to the blue sample stream BI. Microcontroller 313 and control circuitry 314 control the horizontal compressor 331 via control signals 336 which are applied to control leads 337.

The horizontal compressor 331 can operate in a number of modes, including a mode where output from ADC 323 is not changed and modes where the number of bits output from horizontal compressor 331 is smaller than the number of bits received by horizontal compressor 331. In some modes, horizontal compressor 331 compresses the streams of digital values from ADC 323 according to a processing method. The processing method reversibly or irreversibly reduces the size of the data stream. The possible methods include many different techniques for altering of the streams of digital samples RI, GI, and BI. For example, digital filtering techniques including low pass finite impulse response (FIR) filtering may be performed by horizontal compressor 331.

In another mode, horizontal compressor 331 performs an averaging function on each digital sample stream RI, GI and BI. For example, if four digital samples are averaged together, a stream of 640 digital samples per line of video information output by triple ADC 323 is compressed by a factor of four into a stream of 160 digital values per line of video information outputted by horizontal compressor 331.

The horizontal compressor can also truncate sample values by dropping least significant bits or by ignoring zero values for the most significant bits. For example, if the three streams RI, BI, and GI each contain six bit values, the output data of horizontal compressor 331 may be compressed from eighteen bits total to sixteen bits or fifteen bits total. Horizontal compressor 331 may also perform vertical compression in addition to horizontal compression.

Output data from horizontal compressor 331 is provided to FIFO memories 338 and 339. Alternatively, if a horizontal compressor 331 is not provided, output from the triple ADC 323 goes into FIFO memories 338 and 339 unchanged.

First FIFO memory 338 has parallel input leads 340, control leads 342, and parallel output leads 344. Second FIFO memory 339 has parallel input leads 341, control leads 343, and parallel output leads 345. Microcontroller 313 and control circuitry 314 provide control signals 346 on control leads 342 and 343. The microcontroller 313 and the control circuitry 314 can be used to programmably control which output signals are stored by the memories 338 and 339. In particular, a start pixel and/or a stop pixel can be set so that only the digital signals corresponding to pixels in the digital image between the start pixel and the stop pixel are stored in memory. In this way only a portion of the video image is saved. This programmable cutting of the image permits trimming of the image and permits a user to select and record only image regions of interest.

Each of the two FIFO memories of this specific embodiment is sixteen bits wide and 910 words deep. In another specific embodiment, each of these two FIFO memories is sixteen bits wide and 1135 words deep. Each of these FIFO memories can store one full uncompressed digitized video line (640 digital values) but cannot store two uncompressed digitized video lines. A memory that can only store one complete uncompressed digitized line is called a "line buffer." In some embodiments of the present invention, each of FIFO memories 338 and 339 is a line buffer.

In some embodiments, a single dual port memory is provided rather than two FIFO memories. In other embodiments, each of the two FIFO memories is replaced with a dual port memory. One port of such a dual port memory receives data either directly from the analog-to-digital converter 323 or indirectly through horizontal compressor 331. The other port of the dual port memory outputs data either directly to bus interface 307 or indirectly to the bus interface 307 through a vertical compressor 347.

Vertical compressor 347 may or may not be provided on some embodiments of the expansion card. In the embodiment of FIG. 3, vertical compressor 347 has parallel input leads 348 and 349 for receiving digital data from FIFO memories 338 and 339, respectively. Vertical compressor 347 also has parallel output leads 350 which provide digital data to bus interface circuitry 307. Vertical compressor 347 of FIG. 3 is operable in several operating modes. In some operating modes, vertical compressor 347 does not compress the data from the FIFO memories 338 and 339. Other modes reduce the amount of data provided to bus interface 307.

A typical function of vertical compressor 347 is to change the number of lines in an image. Often, the number of lines in an original analog signal is not the desired number of lines in a digital image. Vertical compressor 347 may, for example, average a digital value from FIFO memory 338 and a digital value from FIFO memory 339 to combine two or more lines.

In the embodiment shown in FIG. 3, control signals 351 on control leads 352 determine the operating mode of vertical compressor 347. Control signals 351 determine whether the value on input leads 348, the value on input leads 349, or a combination of the values on inputs leads 348 and 349 is provided on output leads 350. The operating mode of the vertical compressor 347 can be controlled by the personal computer through parallel bus 306 and bus interface 307.

In the embodiment of FIG. 3, microcontroller circuitry 313 is coupled to bus interface circuitry 307 so that microcontroller 313 can both receive instructions and send information on parallel bus 306. Microcontroller 313 is also coupled to control circuitry 314 so that microcontroller 313 can monitor the decoding of the incoming video signal by video decoder 315 through the control circuitry 314 and so that microcontroller 313 can control which of the two FIFO memories 338 or 339, to deposit the digital values from horizontal compressor 331. As an alternative, the function of controlling the writing into the FIFO memories 338 and 339 may be performed by other circuitry such as a hardware state machine or a sequencer.

Control circuitry 314 comprises input and output circuitry for microcontroller 313. In some embodiments, control circuitry 314 comprises a phase-locked loop controlled state machine which locks onto the synchronization output signal 321 from video decoder 315 and generates the control signals 330 which determine when and how the triple ADC 323 digitizes the three color analog signals R, G, and B.

Switches 353 may be provided on the expansion card so that the expansion card can be configured in a desired manner and/or so that the port addresses at which the personal computer accesses the expansion card on bus 306 can be changed. An RS-422 connector 354 may be coupled to the microcontroller circuitry 313 to allow the microcontroller to control a VCR or other picture recording device.

Any suitable level of integration may be employed to realize the present invention. One or more application specific integrated circuits (ASICs) may be used to reduce per unit cost and improve reliability. The memory portion of the expansion card may be realized in memory chips separate from the ASICs. Alternatively, the expansion card is realized in standard parts with or without programmable logic.

SPECIFIC EMBODIMENT

Figure 4:
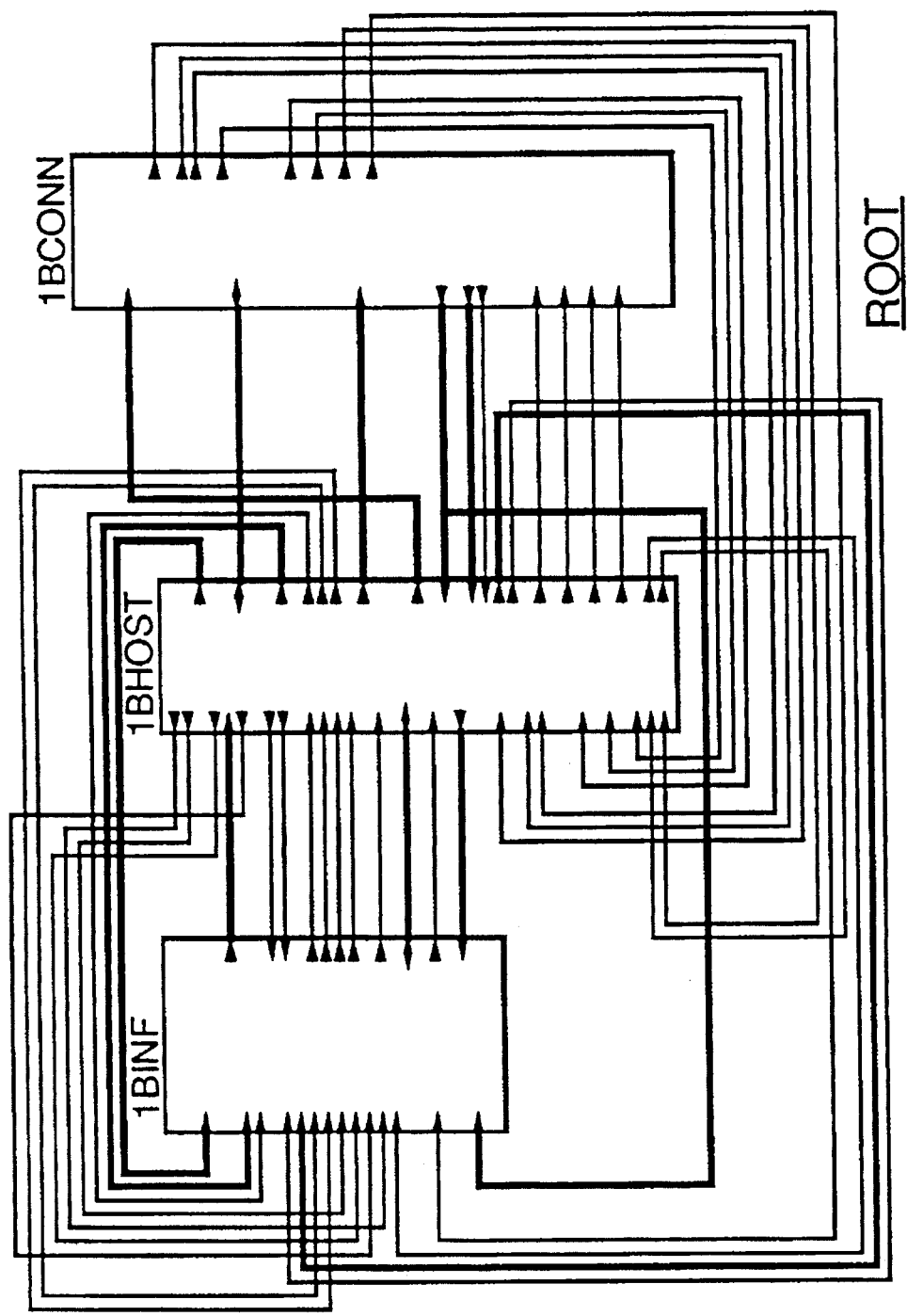
FIGS. 4–26 comprise a hierarchical schematic of one specific embodiment of a video expansion card according to the present invention.
Figure 5:
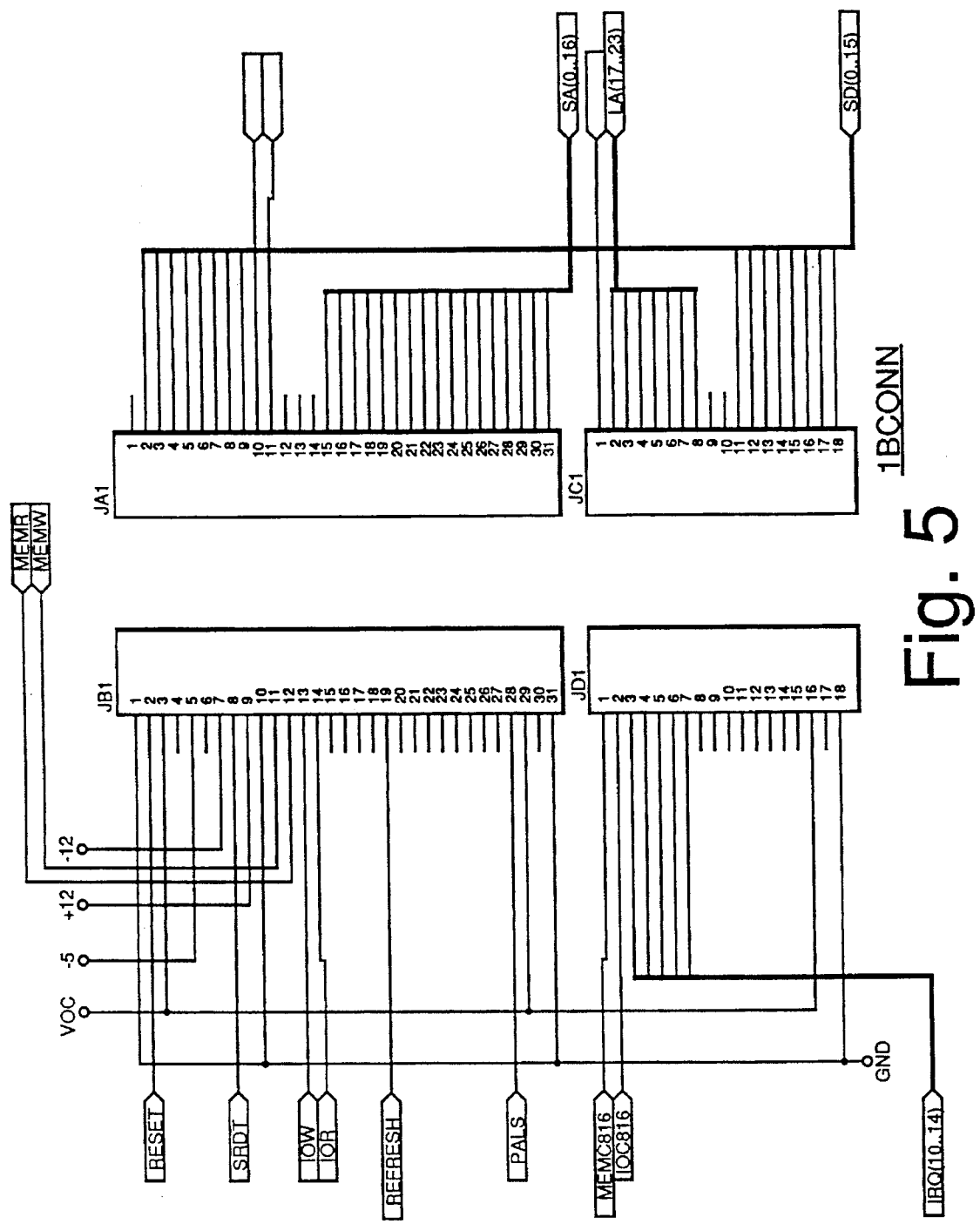
Figure 6:
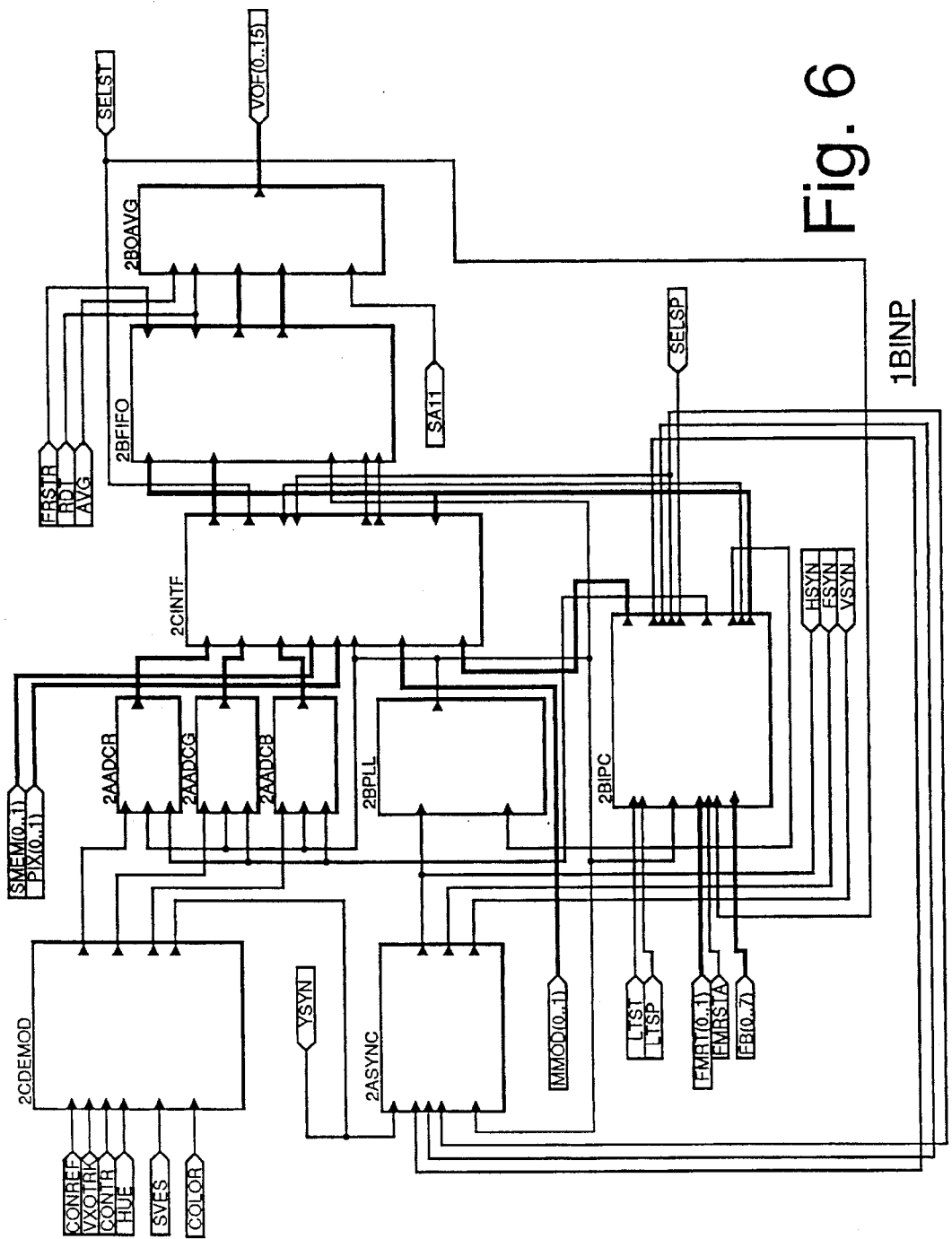
Figure 7:
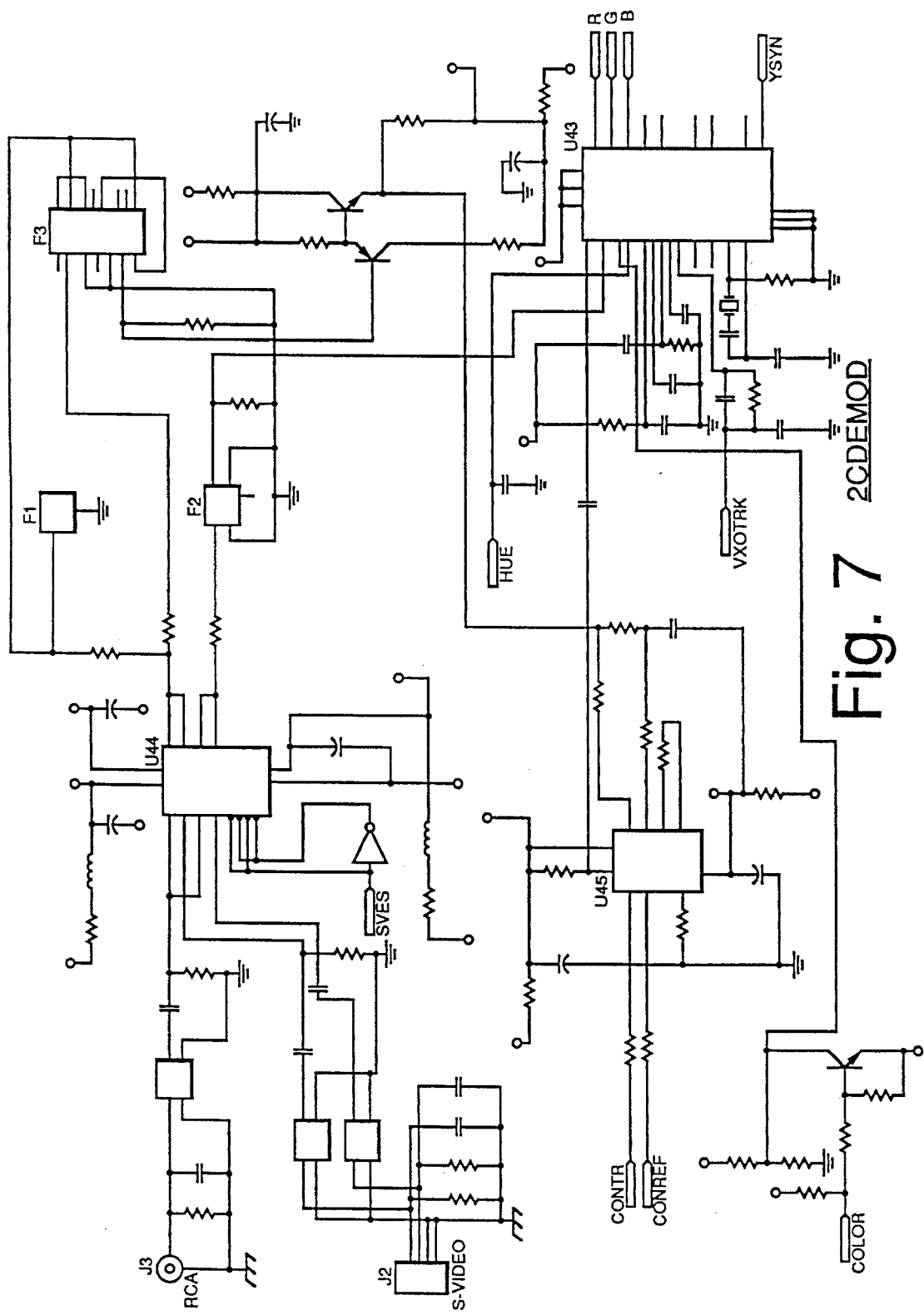
Figure 8:
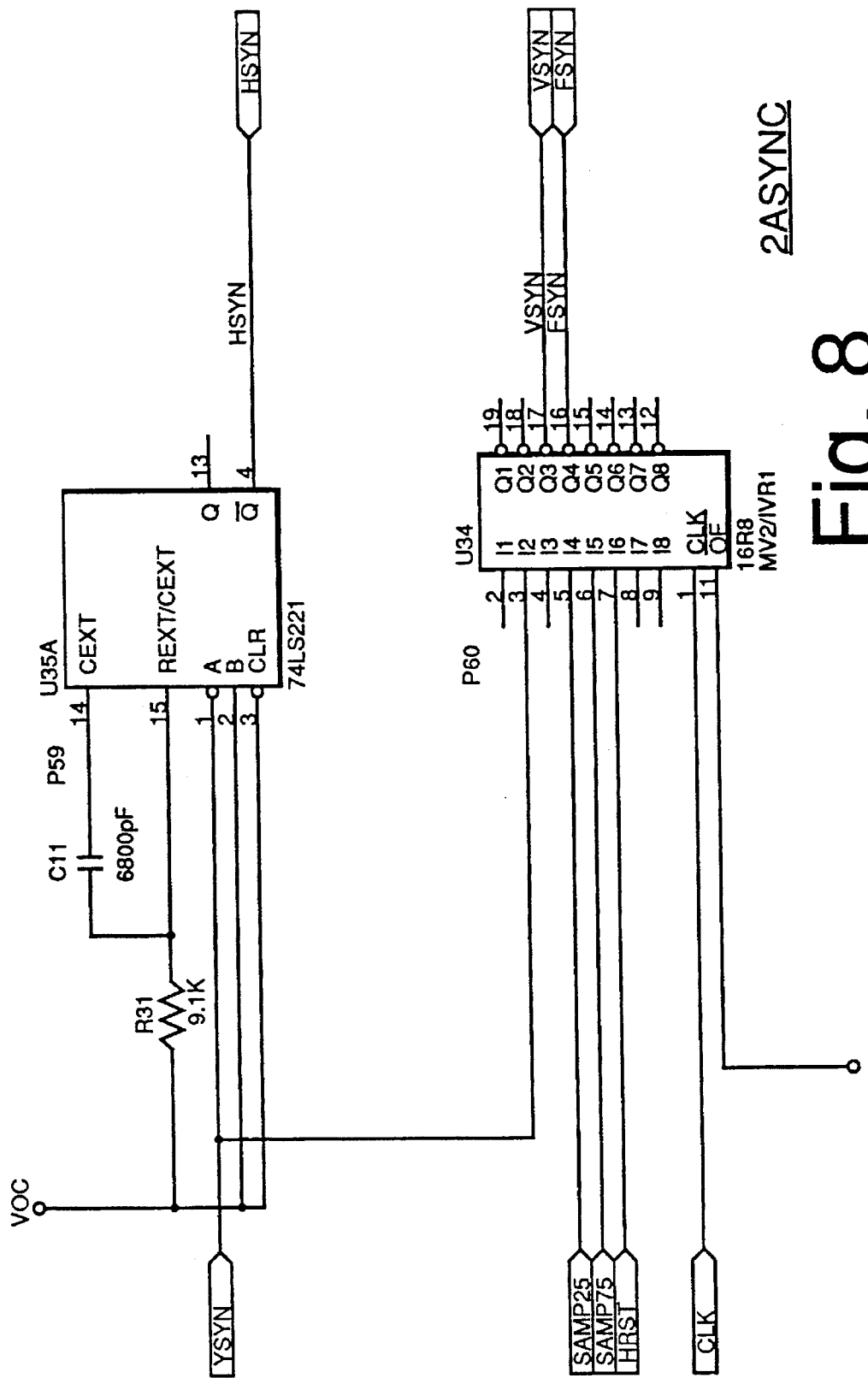
Figure 9:
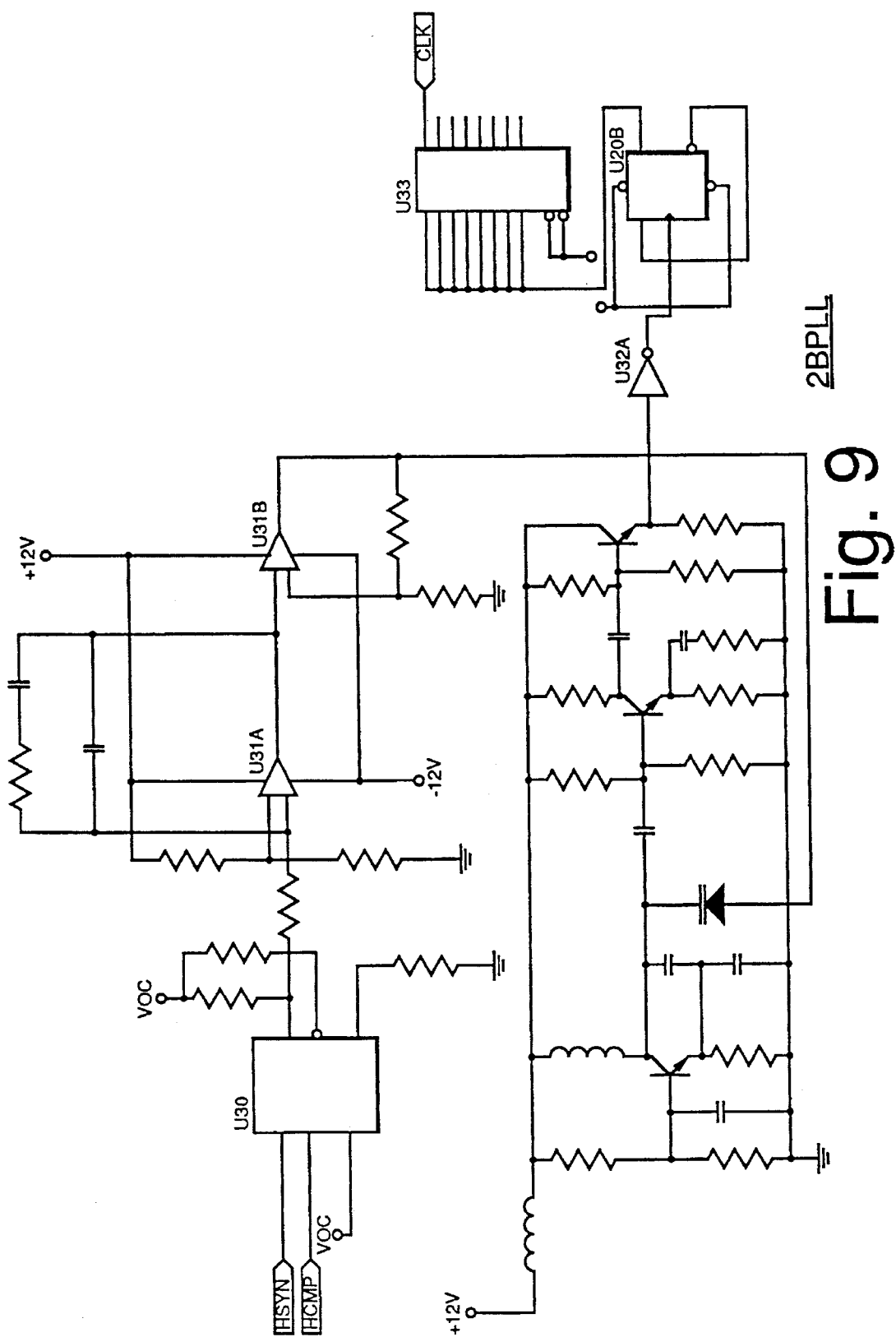
Figure 10:
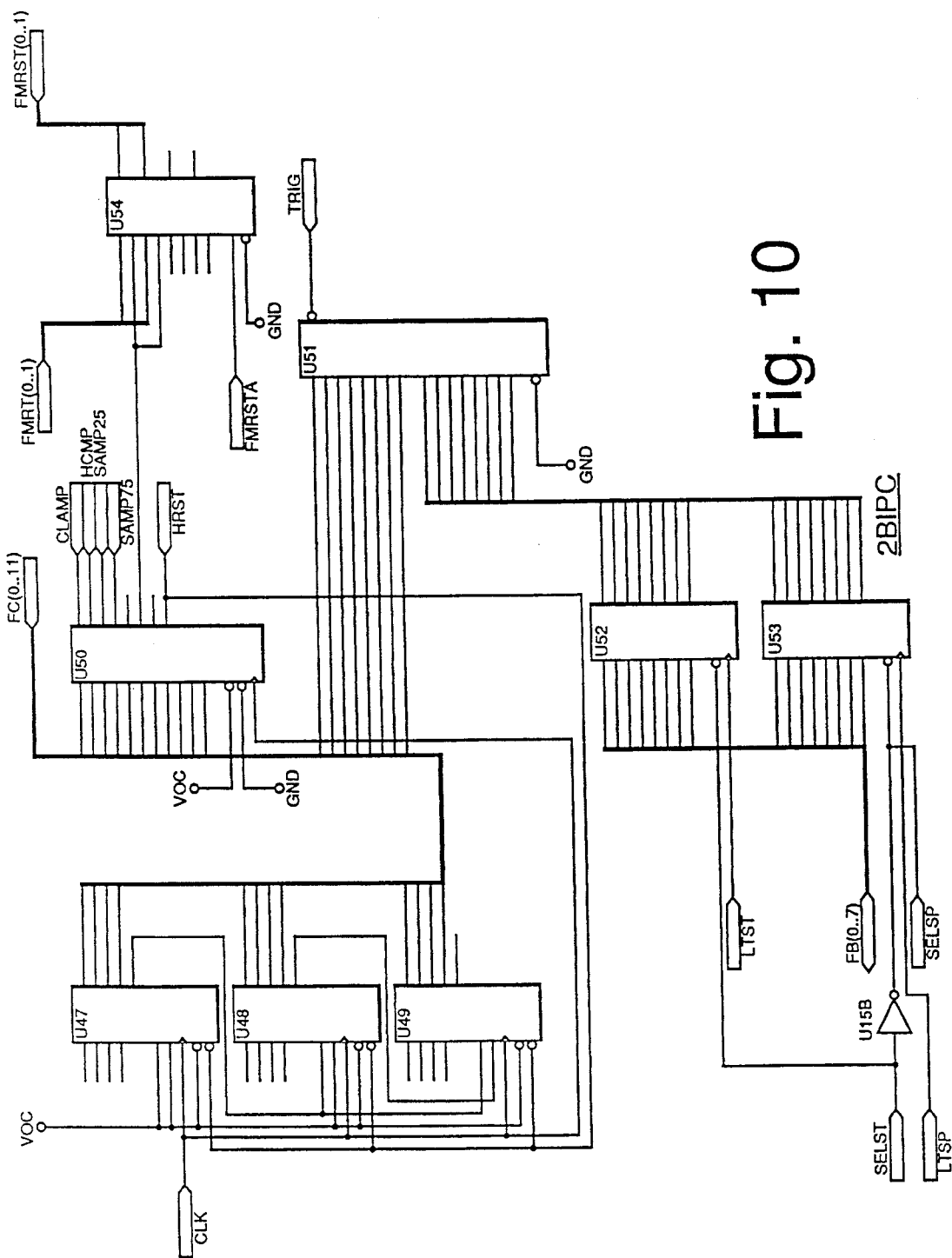
Figure 18:
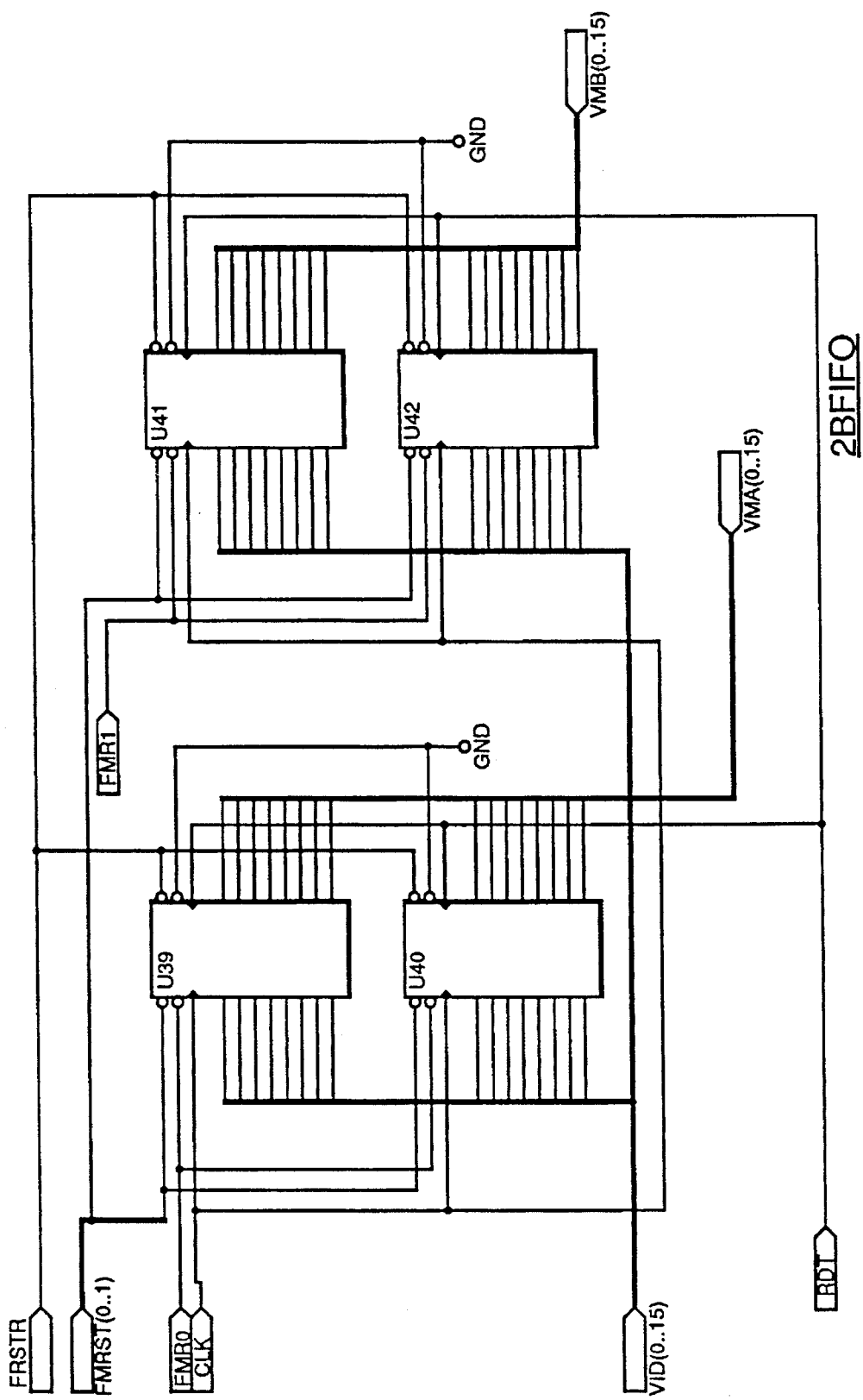
Figure 19:
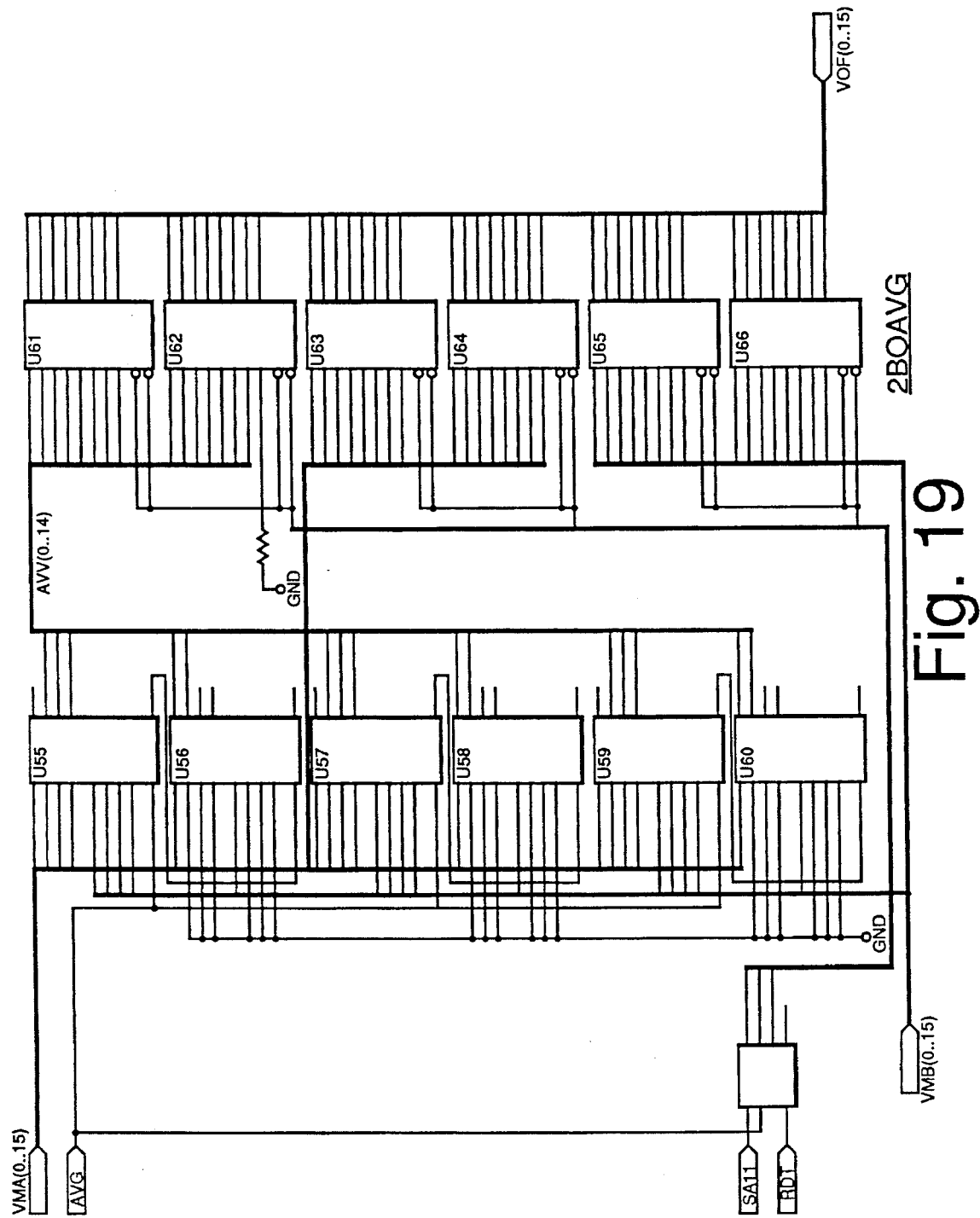
Figure 20:
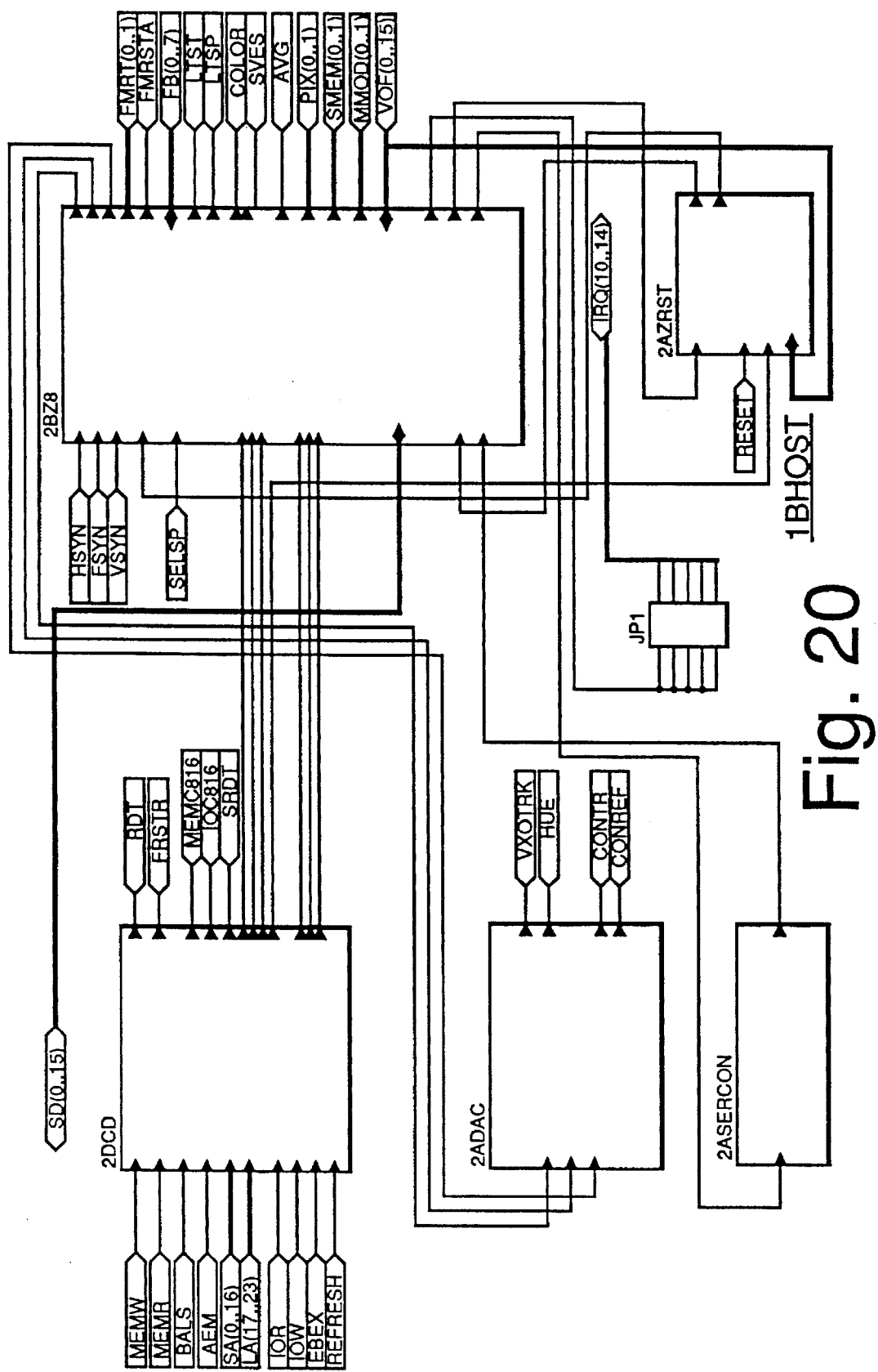
Figure 21:
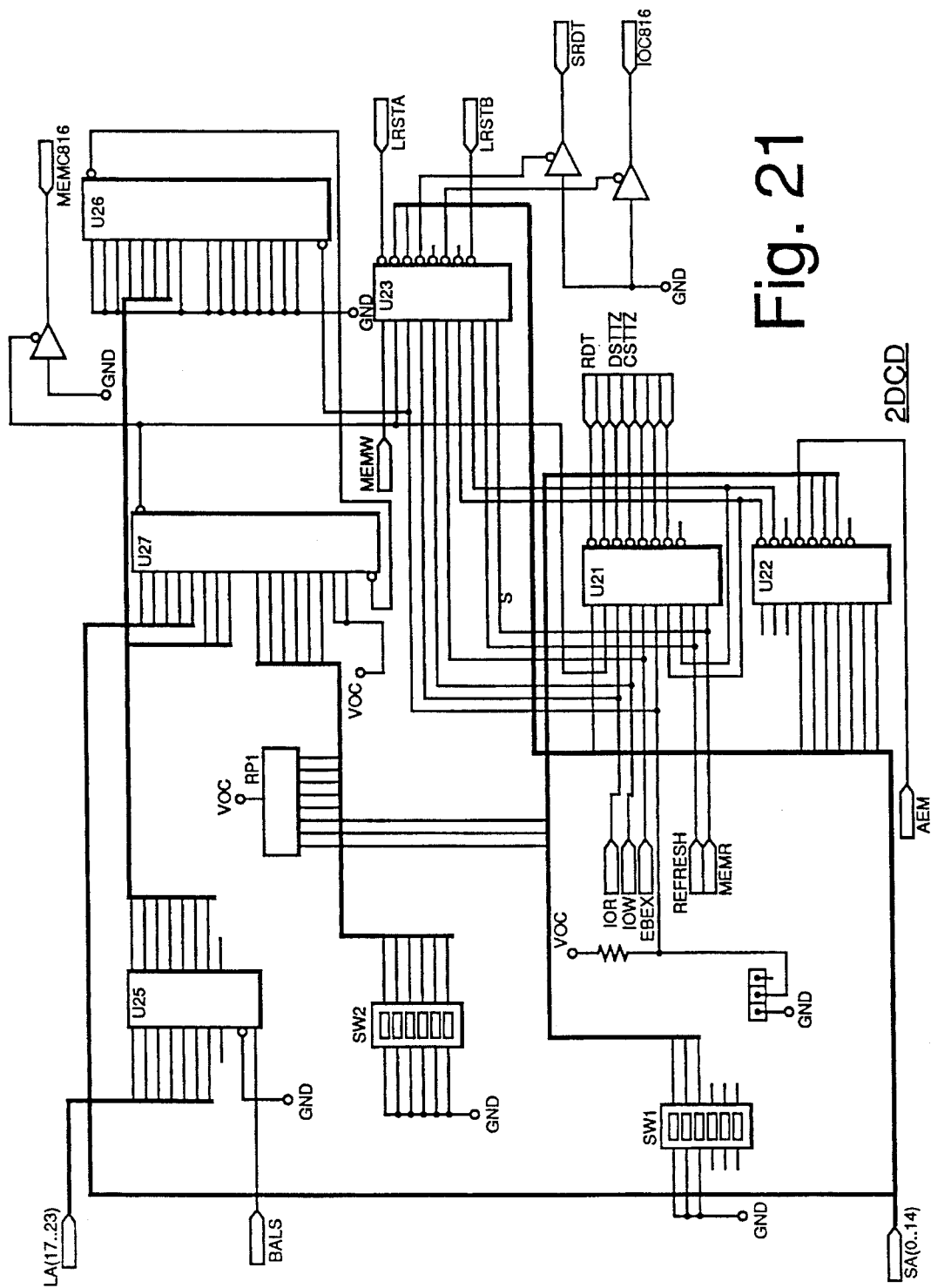
Figure 22:
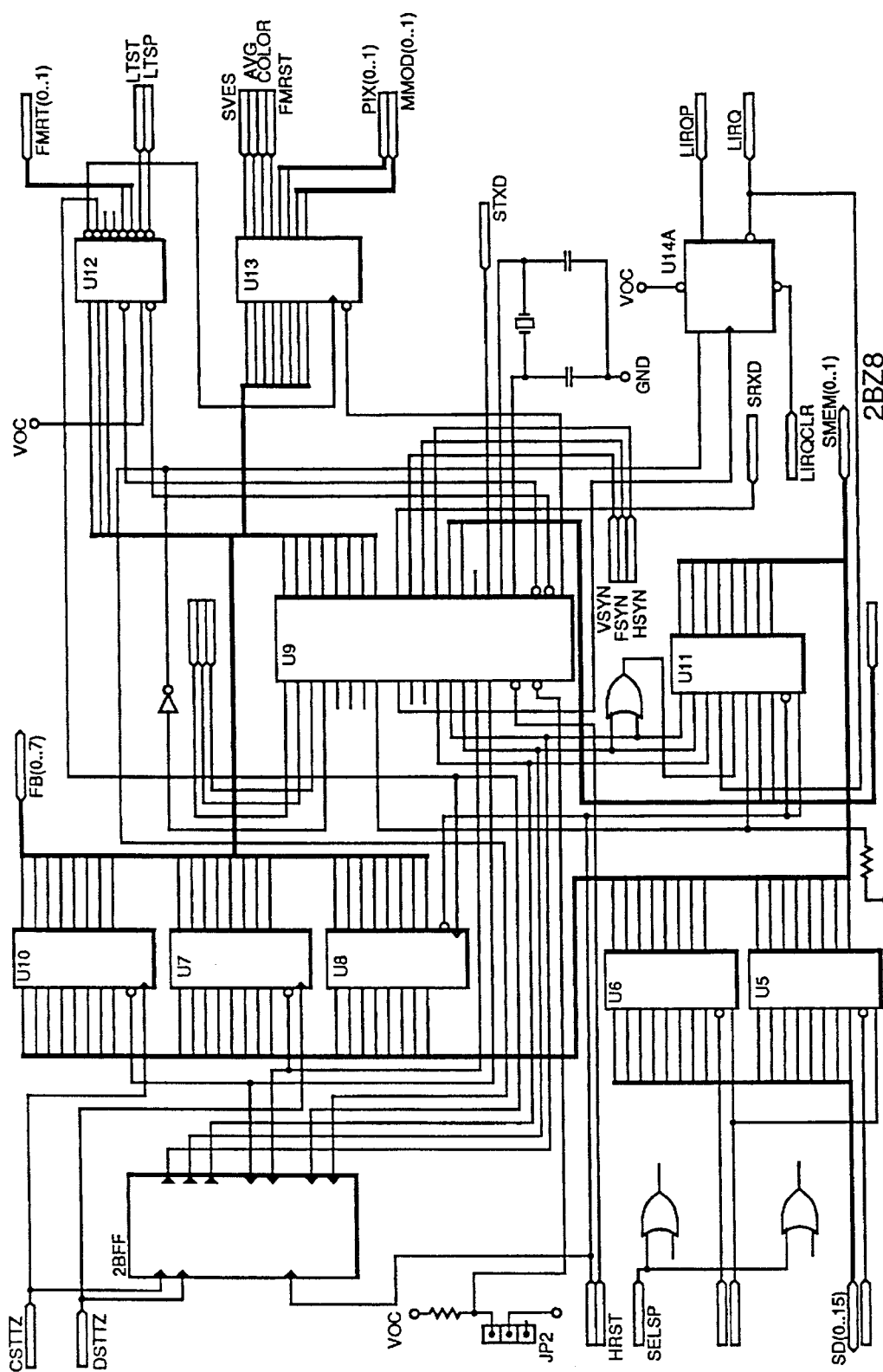
Figure 23:
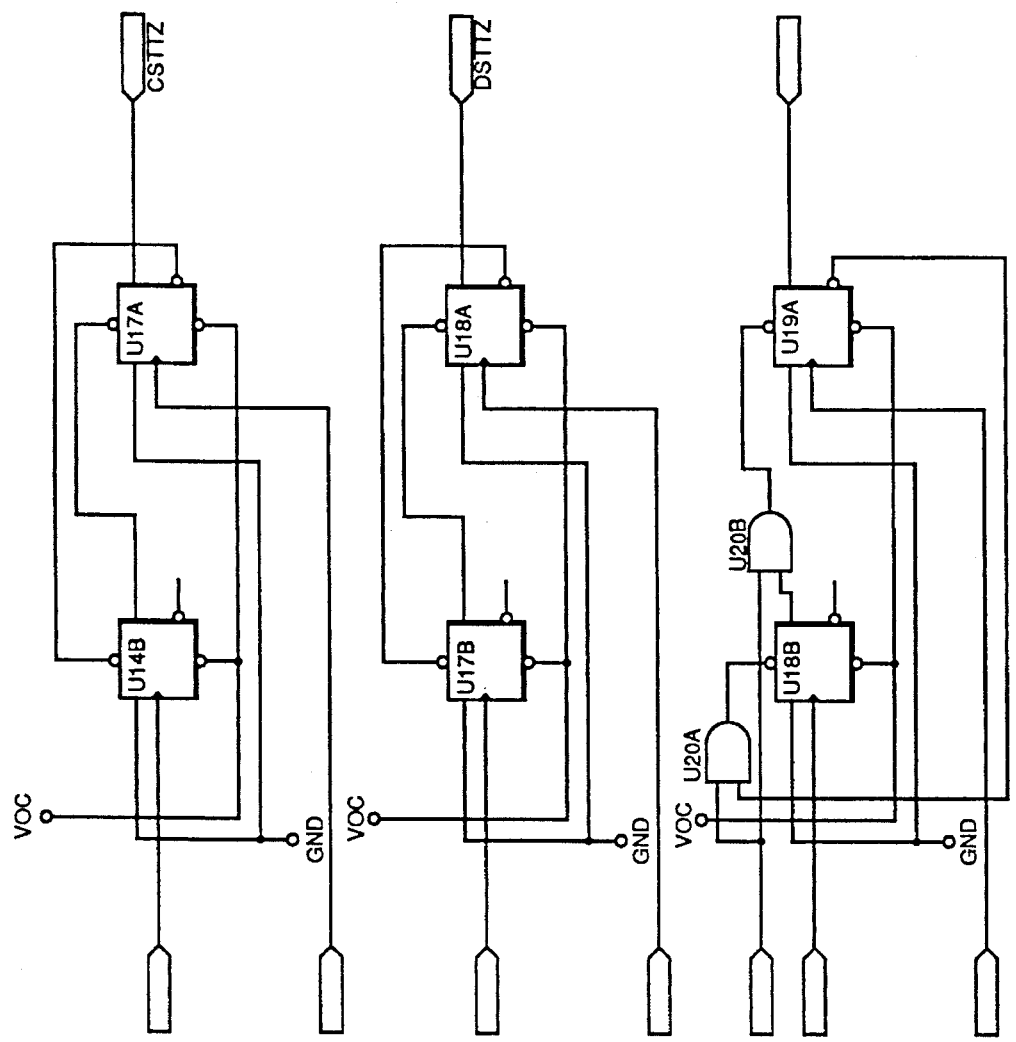
Figure 24:
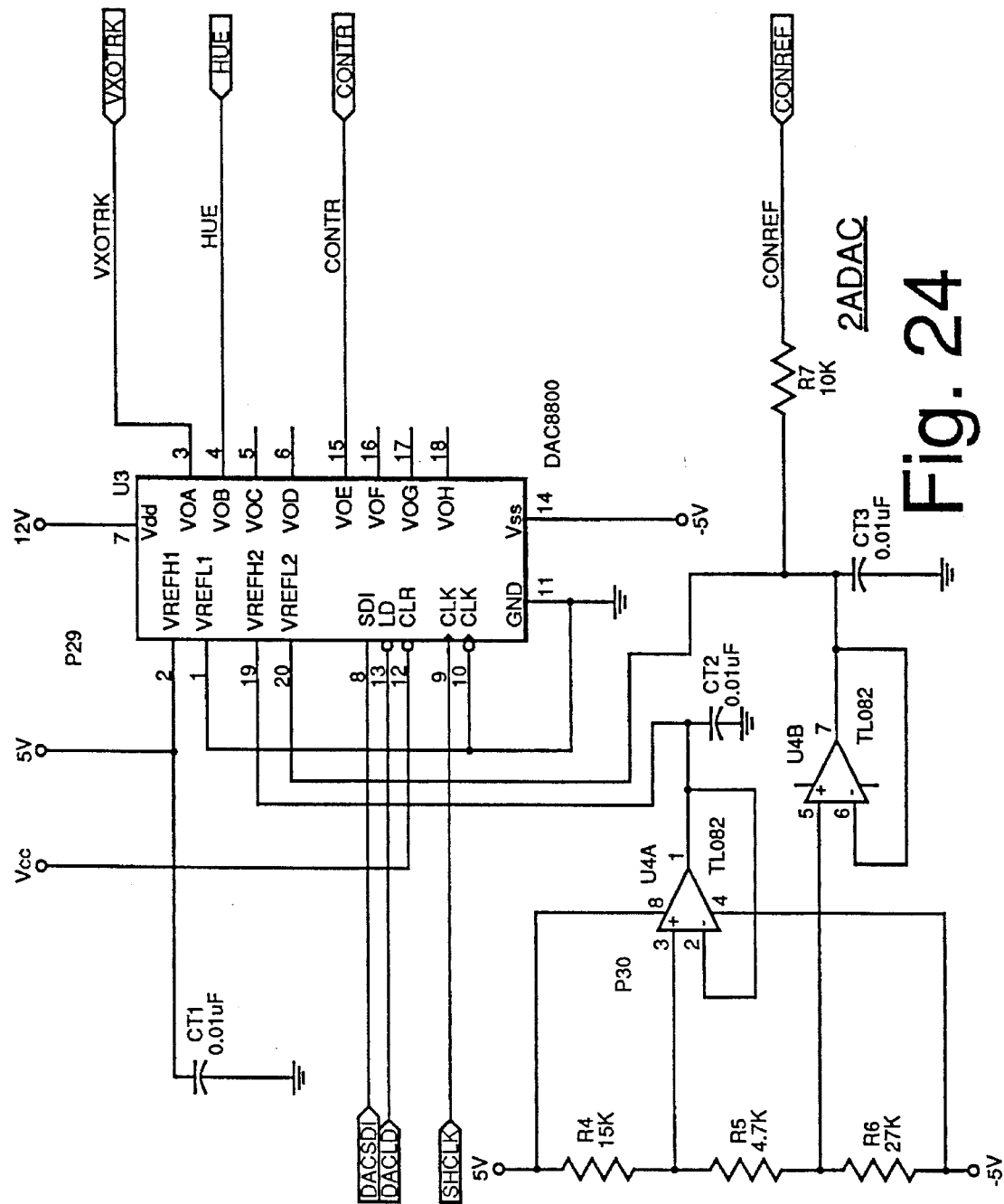
Figure 25:
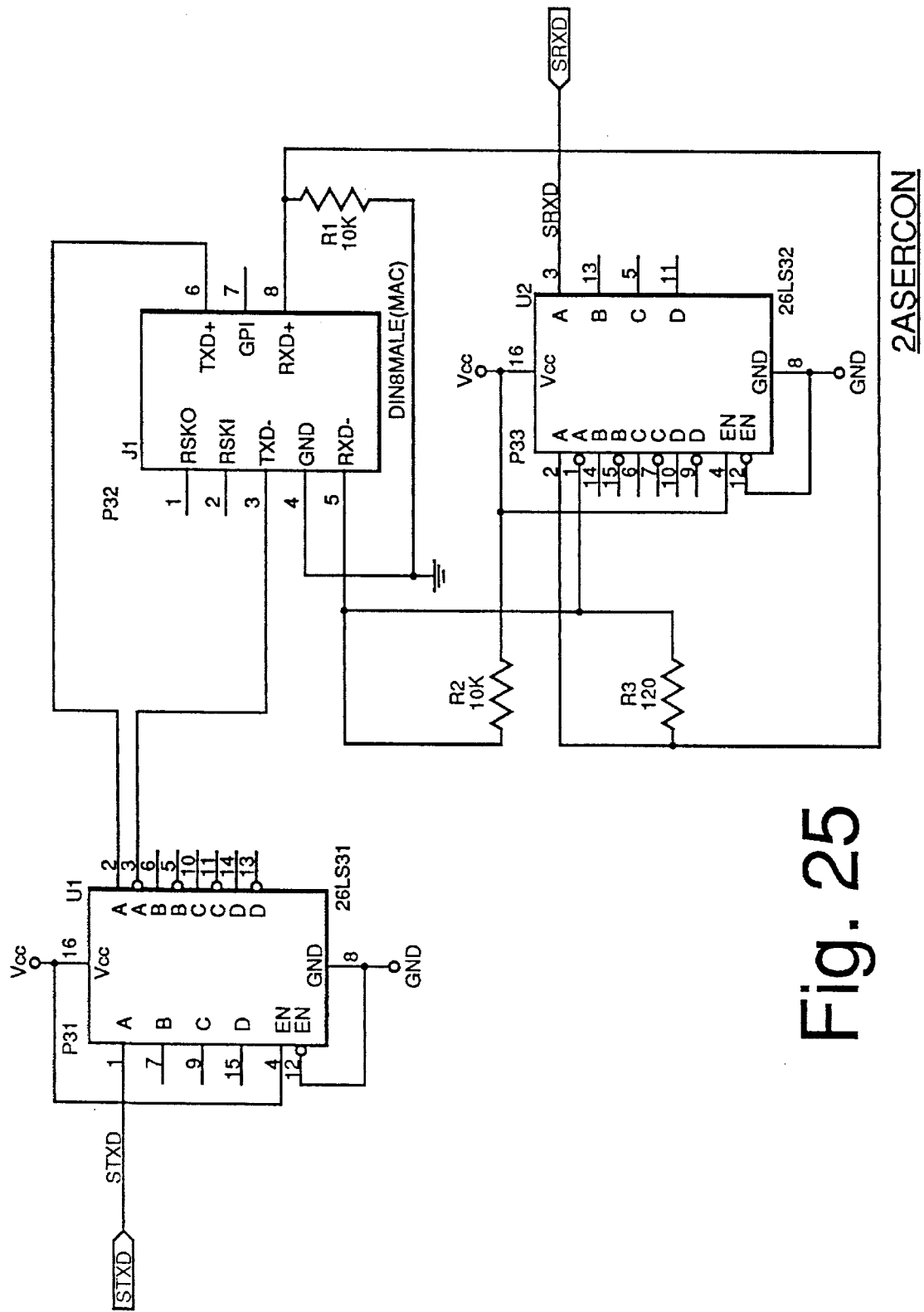
Figure 26:
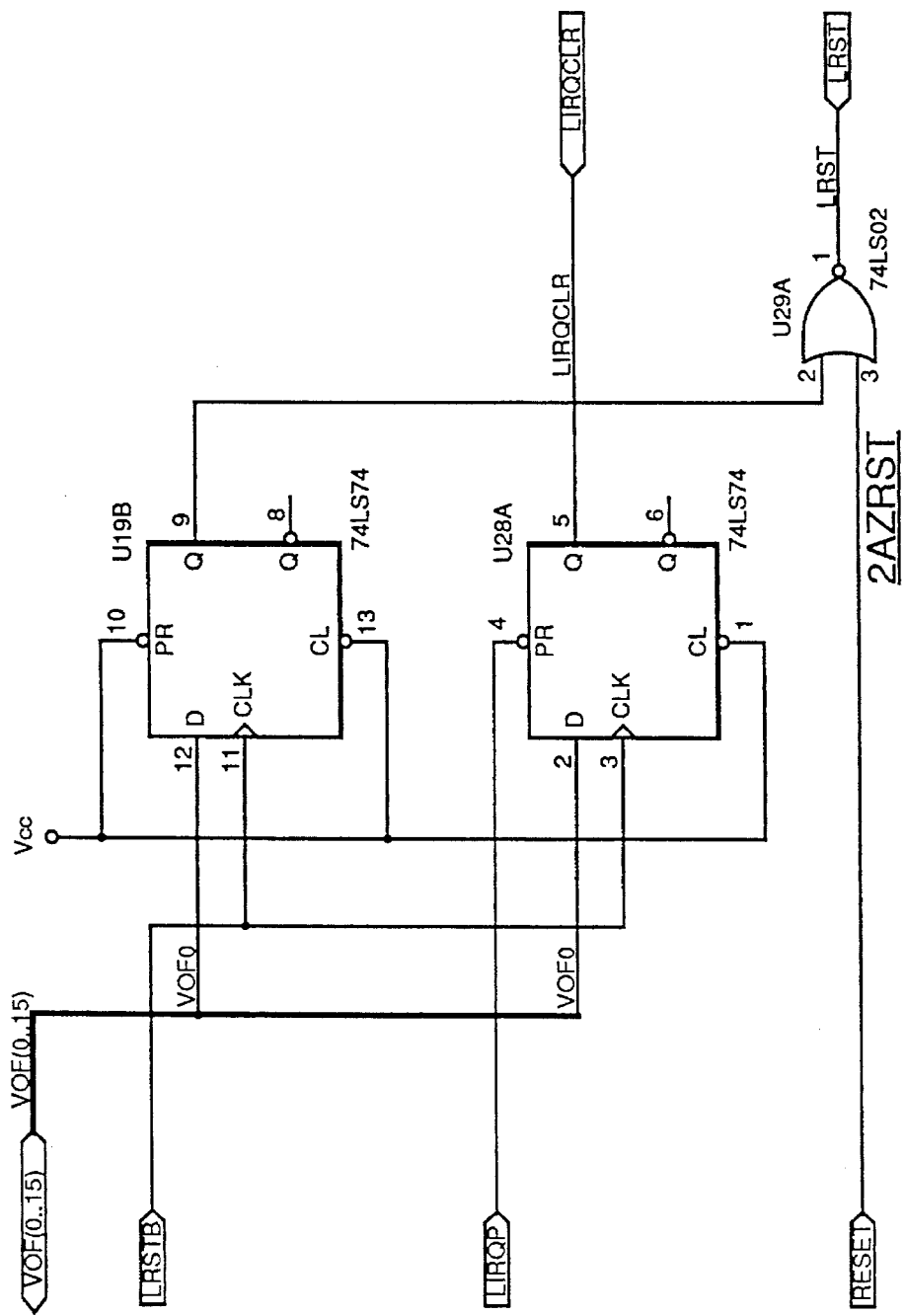

FIGS. 4–26 are block diagrams and schematics of one specific embodiment of the present invention in which standard parts and PALs are used to realize the circuitry of the expansion card. FIG. 4 is the highest level block diagram of the expansion card. FIG. 4 shows three blocks: block 1BINP, block 1BHOST, and block 1BCONN. FIG. 6 is a block diagram of block 1BINP; FIG. 20 is a block diagram of block 1BHOST; and FIG. 20 is a block diagram of block 1BCONN. The contents of block 2CDEMOD of FIG. 6 is shown in FIG. 7; the contents of block 2ASYNC is shown in FIG. 8; the contents of block 2BPLL is shown in FIG. 9; the contents of block 2BIPC is shown in FIG. 10; the contents of block 2CINTP is shown in FIG. 14; the contents of block 2BFIFO is shown in FIG. 18; and the contents of block 2BOAVG is shown in FIG. 19. The contents of block 2BDCD of FIG. 20 is shown in FIG. 21; the contents of block 2ADAC is shown in FIG. 24; the contents of block 2ASERCON is shown in FIG. 25; the contents of block 2BZ8 is shown in FIG. 22; and the contents of block 2AZRST is shown in FIG. 26.

An RCA connector J3 and an S-video connector J2 are shown schematically in FIG. 7. Metallized fingers on one side of an extension portion of the printed circuit board are indicated on FIG. 5 by reference numerals JB and JD. This extension fits into a card edge connector of an ISA bus. Metallized fingers on the other side of the extension portion of the printed circuit board are indicated on FIG. 5 by reference numerals JA and JC. Reference numeral U44 of FIG. 7 indicates an analog switch which serves as an 2-to-1 selector, reference F1, F2, F3 indicates filters which filter the output of the selector, and reference numeral U43 of FIG. 7 indicates a video decoder chip which receives the output of the filters F1, F2 and F3. Monostable multivibrator U35A of FIG. 8 generates horizontal synchronization signal HSYN from composite video synchronization signal YSYN output from video decoder chip U43 of FIG. 7. Part U34 recovers the vertical synchronization signal VSYN and the frame synchronization signal FSYN.

FIGS. 9 and 10 show a phase-locked loop which locks onto signal HYSN to generate the control signals output by parts U50, U51 and U54 of FIG. 10. FIG. 9 shows a discrete voltage controlled oscillator (VCO) which outputs a analog sine wave signal, which is then converted to a signal CLK. A phase comparator signal HCMP is fed back to the input of the phase detector U30 phase-locked loop in FIG. 9.

Figure 11:
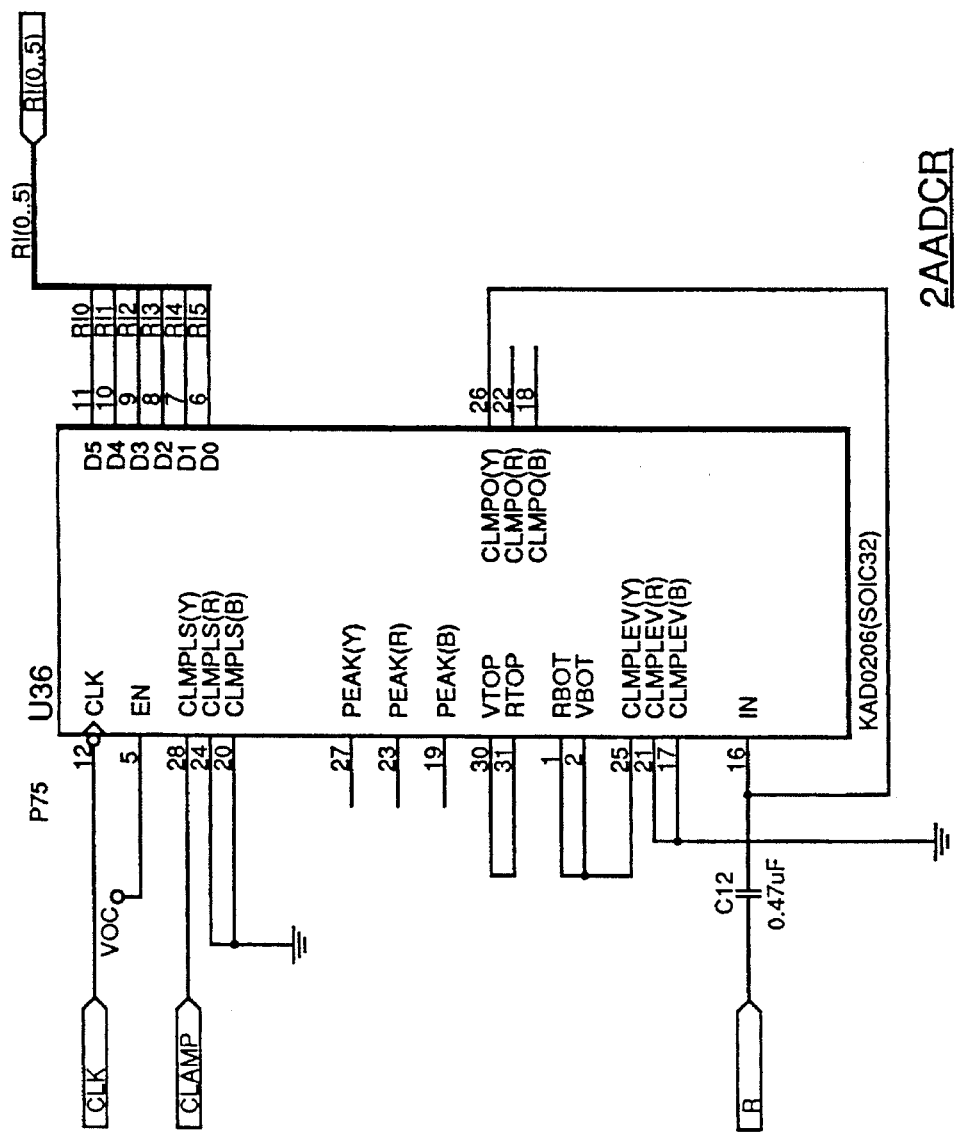
Figure 12:
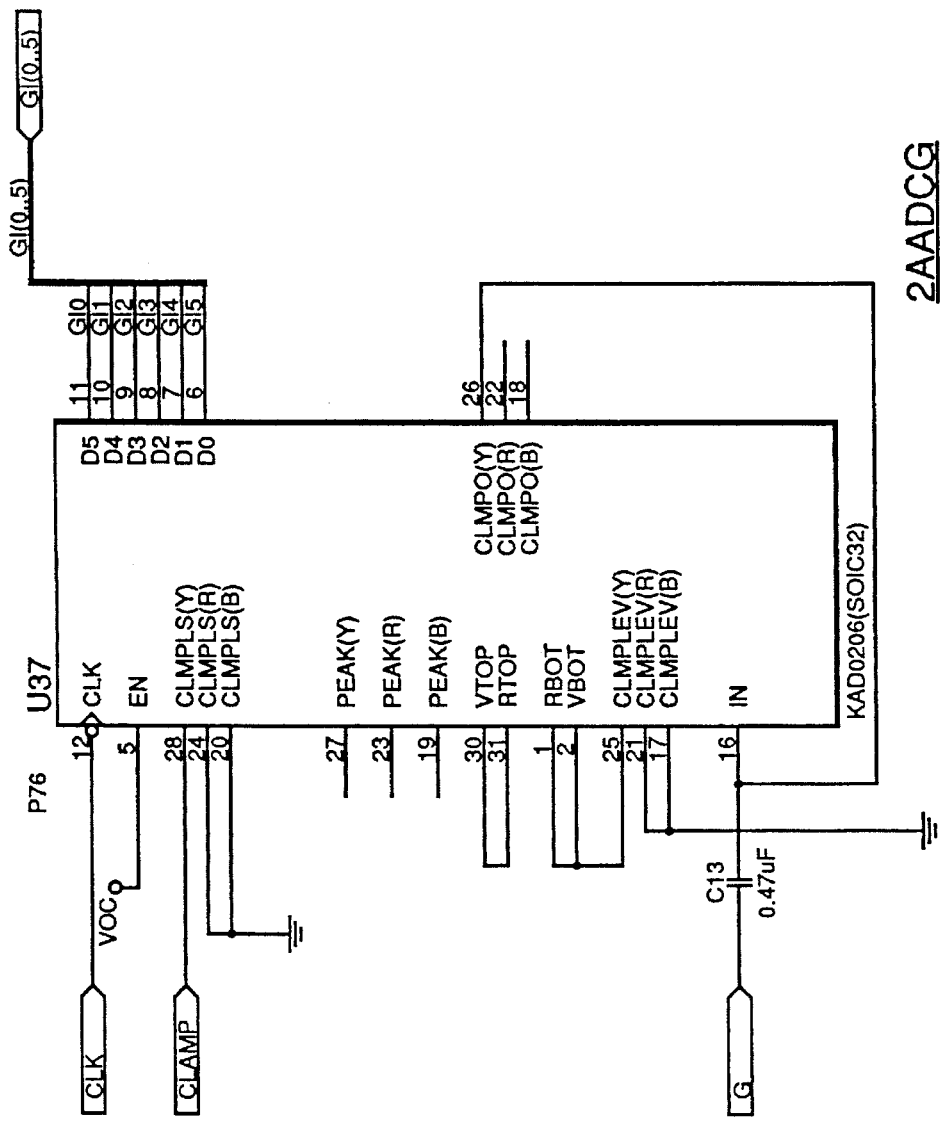
Figure 13:
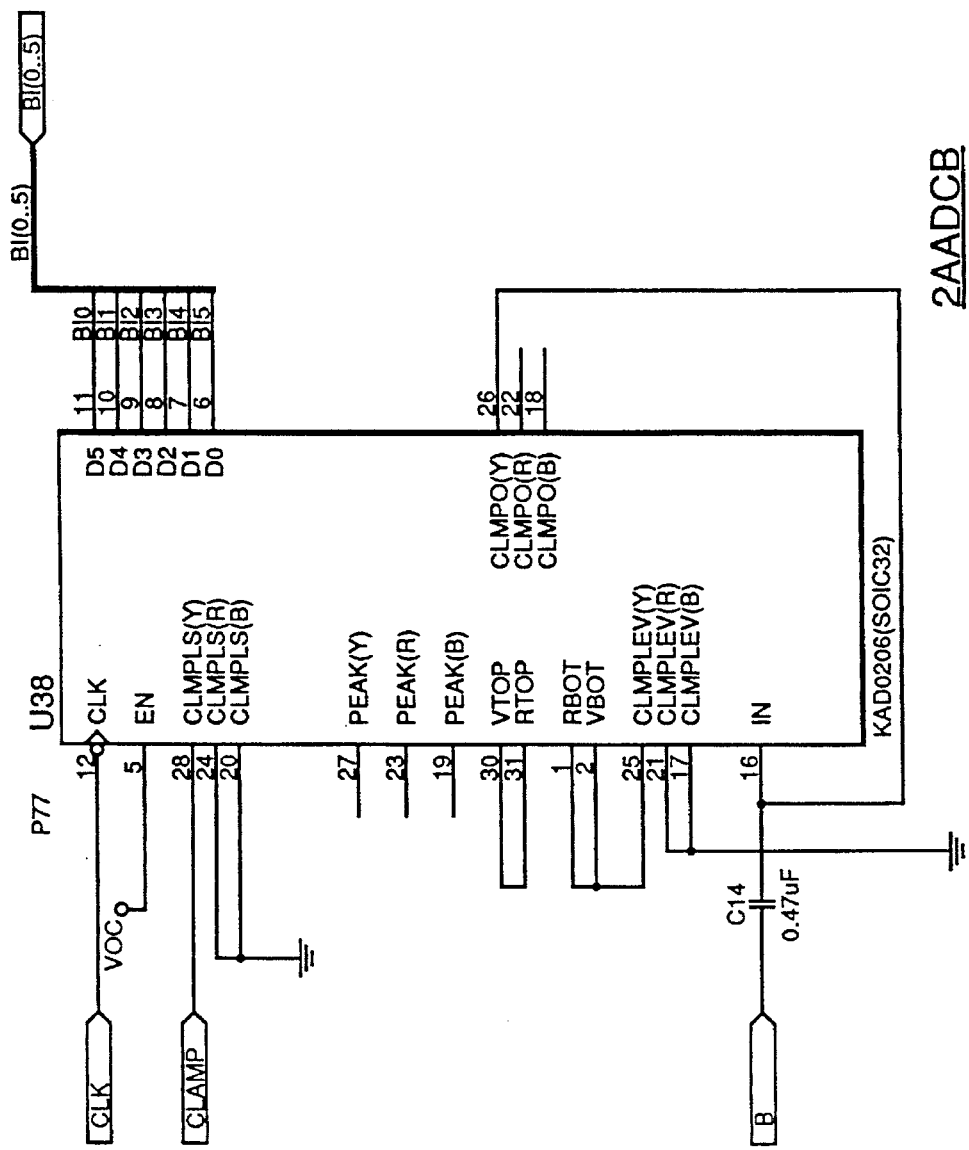
Figure 14:
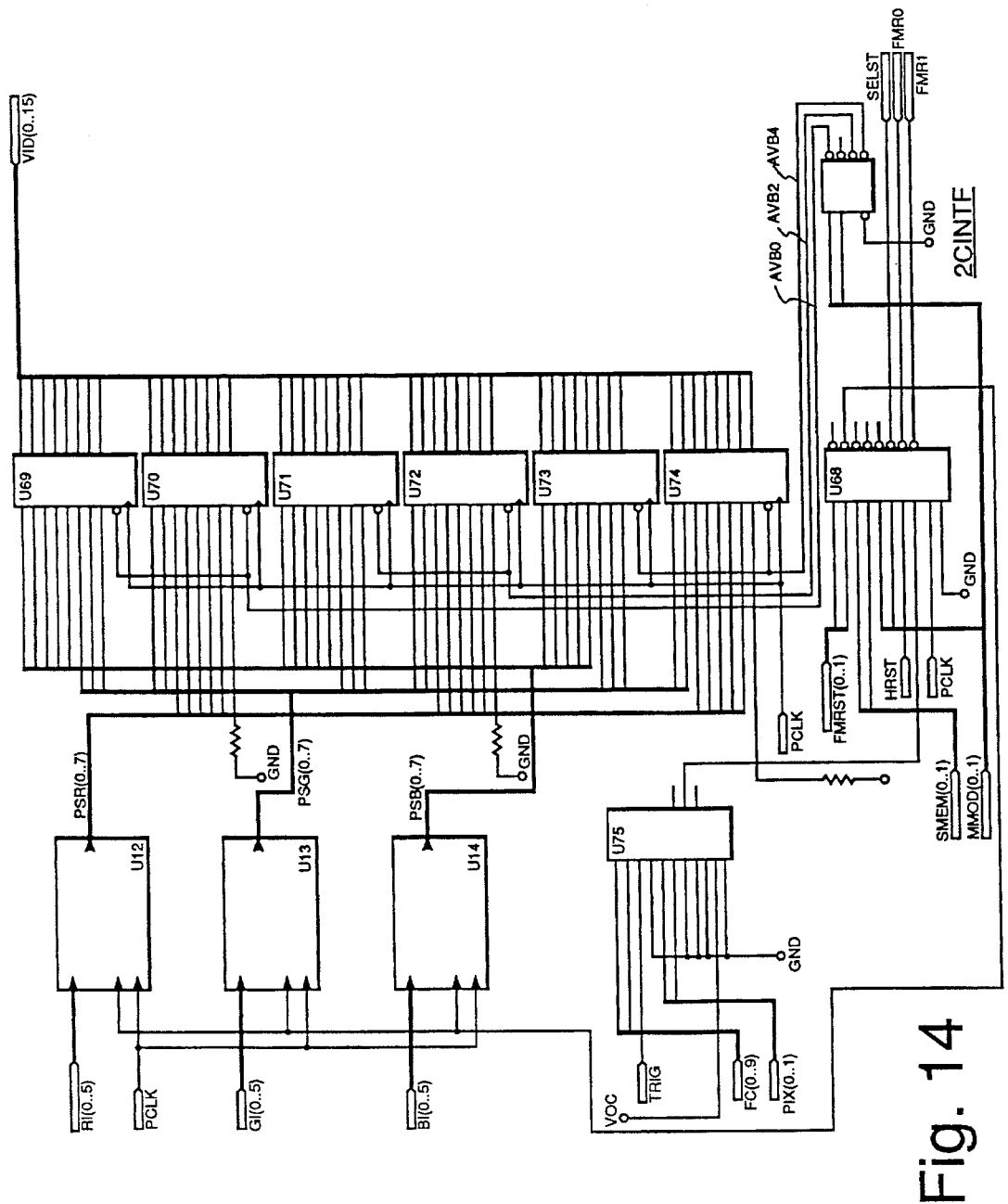

FIGS. 11, 12, and 13 are schematic diagrams of the ADC of the specific embodiment of FIGS. 4–26. FIG. 11 shows an ADC U36 which digitizes the red analog signal R. FIG. 12 shows an ADC U37 which digitizes the green analog signal G. FIG. 13 shows an ADC U38 which digitizes the blue analog signal B.

Figure 15:
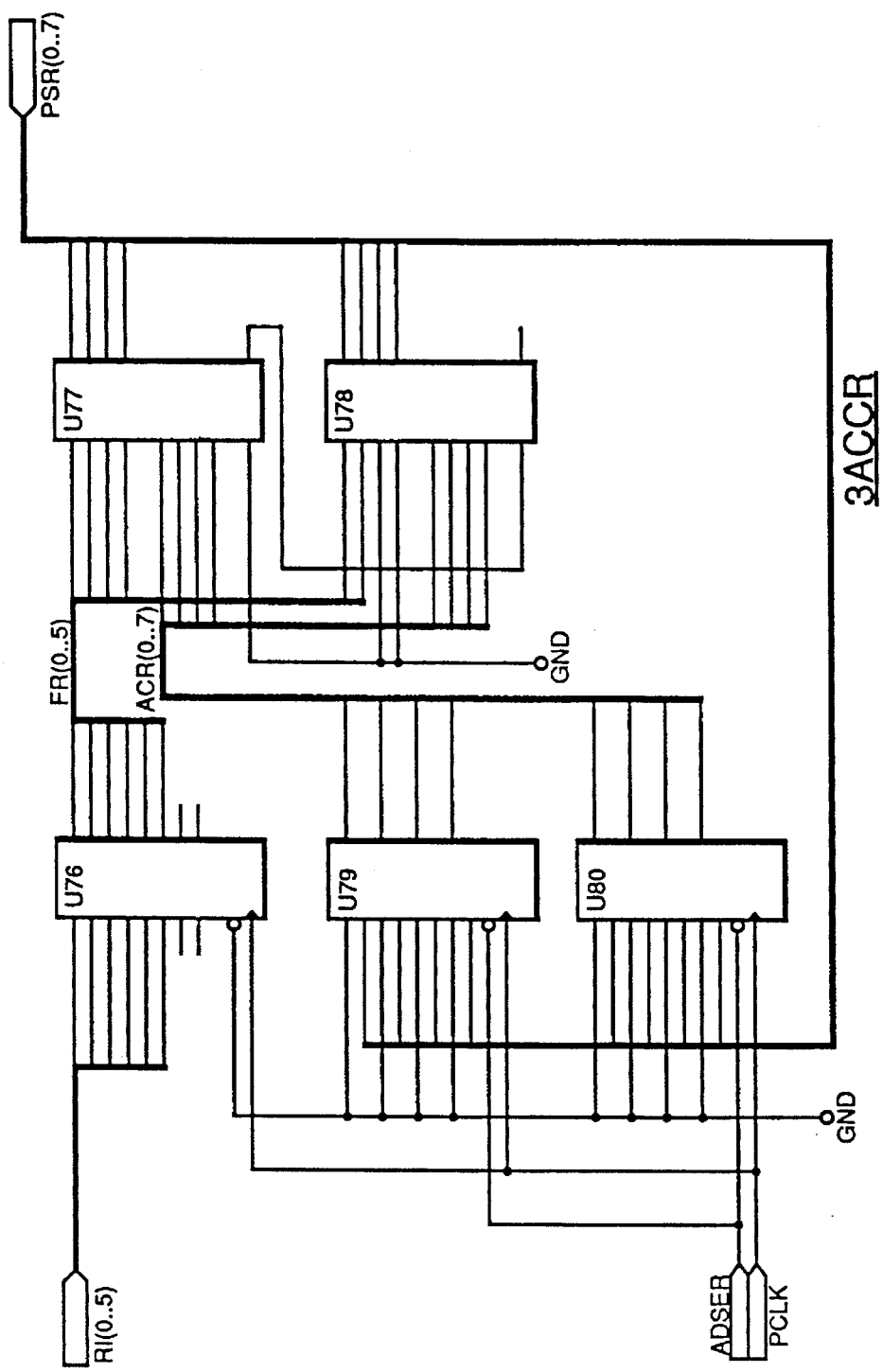
Figure 16:
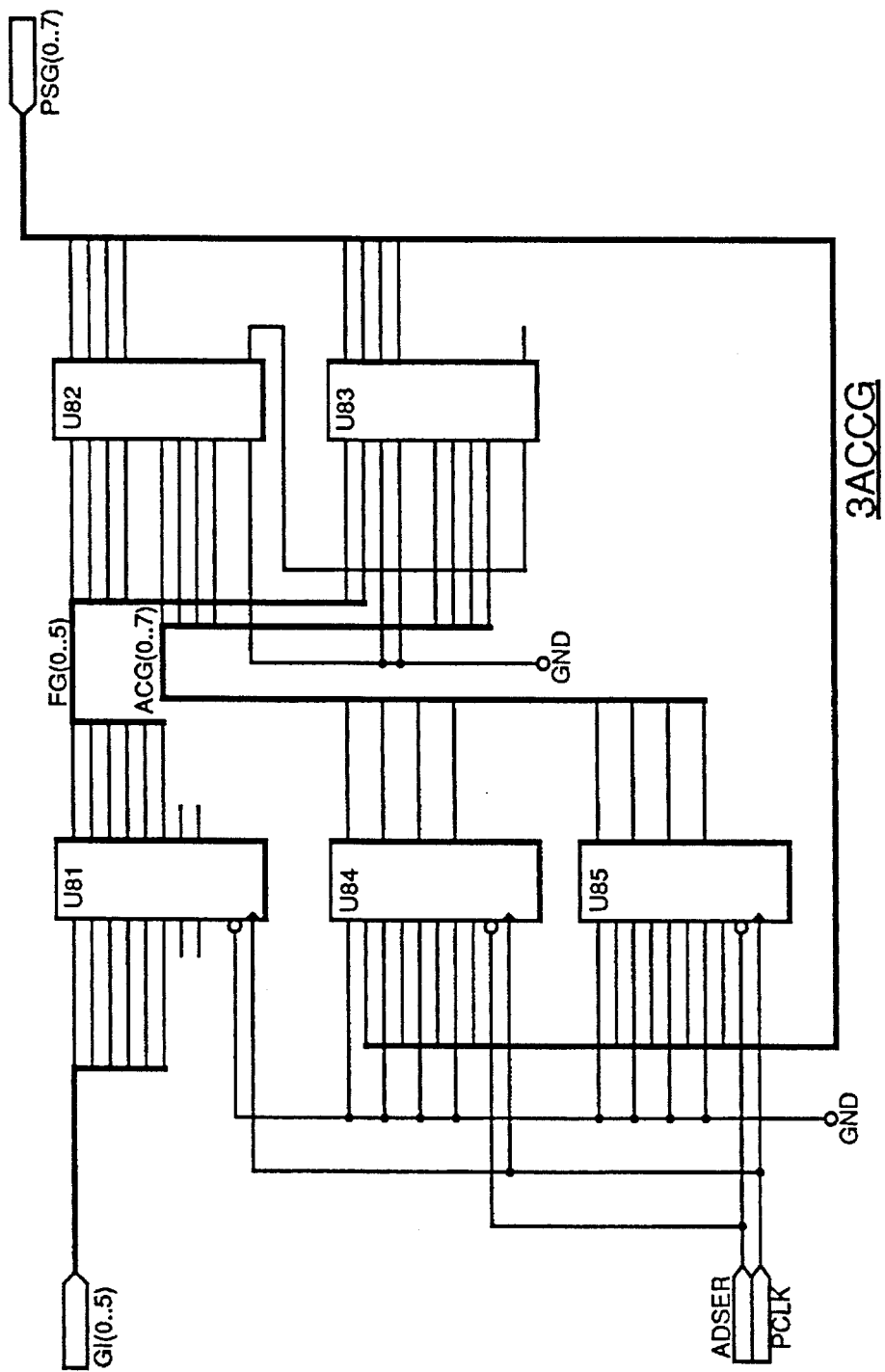
Figure 17:
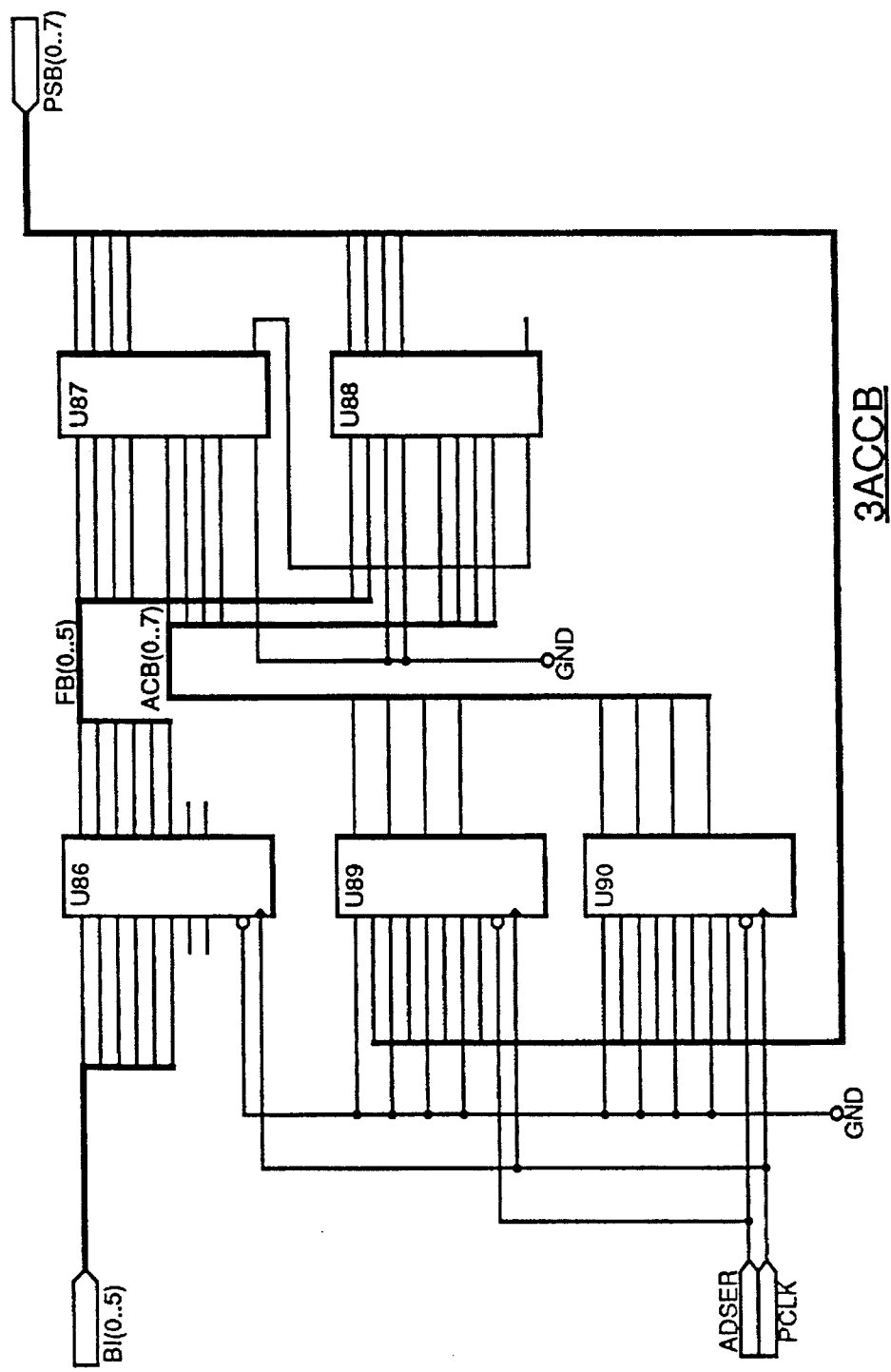

FIGS. 14–17 are schematics showing a horizontal compressor. FIG. 15 shows an accumulator which optionally compresses a stream of incoming red digital samples RI[0..5] into a compressed output signal PSR[0..7]. Parts U77 and U78 output the sum of their inputs FR[0..5] and ACR[0..7] onto PSR[0..7]. The output PSR[0..7] of parts U77 and U78 are, however, are also provided to the inputs of parts U79 and US0. Accordingly, if U79 and U80 are controlled to pass the values on PSR[0..7] to lines ACR [0..7], the sum of the previous red digital sample on inputs RI[0..7] will be added to the present red digital sample on RI[0..7]. Succeeding red digital samples from RI[0..7] are added to this sum until the accumulator is cleared. Operation of the accumulator is controlled by signals ADER and clocked by PCLK. FIG. 16 is a similar accumulator which sums successive green digital samples received on GI[0..7]. FIG. 17 is a similar accumulator which sums successive blue digital samples received on BI[0..7]. The outputs PSR[0..7], PSG[0..7], and PSB[0..7] of the accumulators of FIGS. 15, 16 and 17 are merged into a single output of the horizontal compressor, VID[0..15], as shown in FIG. 14. If each of the three accumulators is set to average each successive four digital samples of its digital sample stream, an average of these four digital samples requires that the sum of the four samples be divided by four. Dividing by four in digital logic is easily accomplished by shifting two places. Accordingly, if the three accumulators are set to sum four digital samples, the two-bits-shifted output of parts U73 and U74 is selected to be the output of the horizontal compressor. If the three accumulators are set to sum two digital samples, the one-bit-shifted output of parts U71 and U72 is selected to be the output of the horizontal compressor. If the three accumulators are set so that the digitized samples just pass through the accumulators unsummed, the unshifted output of parts U69 and U70 is selected to be the output of the horizontal compressor. Note that the grouped single bus VID[0..15] output from the horizontal compressor actually is composed of five signal lines carrying the output of the red accumulator 3ACCR, five signal lines carrying the output of the green accumulator 3ACCG, and five signal lines carrying the output of the blue accumulator 3ACCB. The 16th bit is currently unused but can be used to convey other information.

A first FIFO memory and a second FIFO memory of the specific embodiment of FIGS. 4–26 are shown in FIG. 18. Parts U39 and U40 comprise the first FIFO memory which may be 910 or 1135 words deep. Parts U41 and U42 comprise the second FIFO memory which is of the same depth as the first. 16-bit input bus VID[0..15] is received from the horizontal compressor and is supplied to the inputs of both the first and the second FIFO memories. The output of the first FIFO memory is 16-bit output bus VMA[0..15]. The output of the second FIFO memory is 16-bit output bus VMB[0..15]. In embodiments such as this embodiment, the expansion card takes advantage of the low cost of commercially available high volume production discrete memory parts.

A vertical compressor of the specific embodiment of FIGS. 4–26 is shown in FIG. 19. Parts U55–U60 comprise an adder which outputs the sum of the value on VMA[0..15] from the first FIFO memory and the value on VMB[0..15] from the second FIFO memory onto a bus AVV[0..14]. Depending on the values of control lines AVG, SA11, and RDF which are determined by the personal computer via the ISA bus, either parts U61 and U62 output the sum of VMA[0..15] and VMB[0..15] onto bus VOF[0..15], or parts U63 and U66 output VMA[0..15] onto bus VOF[0..15], or parts U64 and U65 output VMB[0..15] onto bus VOF[0..15].

A Z8GC40 microcontroller U9 having internal RAM and internal program ROM is shown in FIG. 22. Buffer interface circuitry is shown in FIGS. 21, 22 and 23. Parts U21–U23, U26 and U27 comprise address decode circuitry for detecting specific addresses on the ISA bus. Part U25 is an address latch for latching address information for the decode circuitry from the ISA bus.

To output to the ISA bus of the IBM PC, for example, the microcontroller U9 communicates through bus PB[0..7], through part U8, the through bus interface buffers U6 and U5, to lines SD[0..15] of the ISA bus. The personal computer can pass instructions to the microcontroller by writing an instruction word to a command data register pad U10 of the bus interface located in I/O space on the ISA bus. The instruction word is latched into U10 and an accompanying data word is latched into data register U7. The register written depends on the I/O space address received by the bus address decode circuitry of FIG. 21 during an ISA bus write. After the instruction word is latched into U10, the microcontroller U9 can read the command data register U10 and data register U7 to get the instruction. Signals DSTTZ and CSTTZ received in FIG. 23 indicate to the microcontroller that the personal computer has loaded data and instruction information into registers U7 and U10, respectively. Such an instruction word received by the microcontroller U9 may, for example, determine the exact pixel location in the frame of the incoming video signal at which video data begins to be written into the memory. Another instruction may tell the microcontroller to stop writing into the memory after a second pixel location in the frame of the incoming video signal. The microcontroller can also output status information to the personal computer over the ISA bus by writing into status register pad U11. The personal computer can read this status register by accessing the appropriate I/O space address on the ISA bus.

Parts U12 and U13 of FIG. 22 are used to generate output address decode signals from microcontroller U9. The contents of block 3BFF is shown in FIG. 23. This circuitry is used to synchronize ISA bus signals to the microcontroller. FIG. 24 shows an digital-to-analog converter (DAC) U3 which converts digital values supplied by microcontroller U9 into analog control signals VXOTRK, HUE and CONTR. FIG. 25 shows level-shifting transceivers U1 and U2 as well as an RS-422 connector J1 which comprise a RS-422 serial port of the microcontroller U9.

The personal computer can control the start and stop pixel locations within a frame at which video data is written into the memory by writing the start pixel location into register U52 and by writing the stop pixel location into register U53 of FIG. 10. Control signal TRIG clocks a state machine comprising parts U75 and U68 of FIG. 14. This state machine operates in one of three modes of operation under control of microcontroller U9 to determine when and into which FIFO memory digital values from the horizontal compressor are written. Because the microcontroller U9 receives the HYSN signal, the microcontroller can maintain a count of the number of lines so far received so that the microcontroller can determine if it will allow writing into the FIFO memory. The next line signals AVB0, AVB2, and AVB4 from the state machine determine whether the horizontal compressor operates in an average by one mode, an average by two mode, or an average by four mode.

Switches SW1 and SW2 on FIG. 21 are used to set the I/O space and memory space address at which the personal computer can access the expansion card on the ISA bus. The personal computer reads either one or both of the FIFO memories by accessing a memory or I/O space address on the ISA bus.

In operation, in the average by four mode, a small picture with 160 by 120 resolution at approximately 15 frames per second can be reproduced on a VGA screen of the personal computer from a 30 frames per second incoming NTSC or PAL video source. When decompressed and reassembled into the computer's graphics framestore, the output of the expansion card looks like a nearly real time, somewhat jerky, small picture on the personal computer screen. In average-by-two mode, a 320 by 240 resolution picture can be reproduced. In average-by-one mode, a 640 by 480 resolution picture can be produced. The higher resolution modes provide fewer frames per second.

While this invention has been described in connection with the above-described embodiments, the invention is not to be considered limited thereto. Various modifications and adaptations of the above-described embodiments are within the scope of the invention as set forth in the appended claims.

We claim:

1. An expansion card for a personal computer, said personal computer having a bus and a bus connector, comprising:

a printed circuit board having connecting means which is detachably engagable with said bus connector, said board having disposed thereon a video connector for accepting a video signal;

a video decoder communicatively coupled to said video connector for decoding said video signal;

an analog-to-digital converter having an analog input, for accepting said decoded video signal, and a digital output, said analog input being coupled to said video decoder, said analog-to-digital converter outputting a plurality of digitized signal lines forming a frame of a video signal, each of said digitized signal lines having a first plurality of digital samples;

a first data compressor for compressing a second plurality of said digital samples received from said analog-to-digital converter into a first plurality of digital values, said second plurality of digital samples being a portion of said first plurality of digital samples;

a memory coupled to said first data compressor for storing the digital values from said first data compressor, said memory having a maximum storage capacity of less than that required to store an amount of data corresponding to digitized signal lines forming a frame of a video signal; and a second data compressor for compressing the digital values stored in said memory and for coupling said memory to said bus of said personal computer via said connecting means.

2. The expansion card of claim 1, wherein said video connector is selected from the group consisting of: an RCA jack, a mini-DIN four pin connector, a DIN seven pin connector, a BNC connector, and a European video connector.

3. The expansion card of claim 1, wherein said first data compressor and said second data compressor each has a plurality of selectable operating modes, one of said plurality of operating modes transferring stored video data from said memory to said bus connector without compressing said video signal.

4. The expansion card of claim 1, wherein said first plurality of digital samples includes a number of red digital samples, a number of green digital samples, and a number of blue digital samples.

5. The expansion card of claim 4, wherein the number of digital samples in said second plurality of digital samples is the same as the number of digital samples in said first plurality of digital samples.

6. The expansion card of claim 1, further comprising:

a microcontroller that is strategically disposed on said expansion card and communicatively connected to said first data compressor, said memory, and said second data compressor to control the operation of said expansion card.

7. A method of capturing at least a portion of a video signal using a personal computer, said video signal comprising a series of lines forming a series of frames, said method comprising the steps of:

(a) receiving said video signal on a connector, said connector being coupled to a printed circuit board, said printed circuit board being detachably engagable with a bus connector of said personal computer;

(b) digitizing said video signal using an analog-to-digital converter disposed on said printed circuit board;

(c) compressing said digitized video signal using a horizontal data compressor;

(d) storing at least two lines of said compressed video signal into a memory during a frame period, said memory being disposed on said printed circuit board;

(e) compressing said stored video signal using a vertical data compressor; and (f) passing said vertically and horizontally compressed video signal onto a bus of said personal computer coupled to said bus connector.

8. The method of claim 7, wherein said memory is a two-line line buffer.

9. A video capture circuit for compressing one or more frames of video images, each of said frames having a plurality of lines, comprising:

a receiving means for receiving a video input signal in analog form;

a video decoder for separating said video input signal into a corresponding plurality of first component signals in analog form;

an analog-to-digital convertor for converting said first component signals into a corresponding plurality of second component signals in digital form;

a horizontal compressor for compressing a first quantity of said second component signals;

a memory storage unit for storing the compressed second component signals;

a vertical compressor for reading and compressing a second quantity of said compressed second component signals from said memory storage unit;

communication means for outputting said compressed second component signals from said vertical compressor and for receiving externally input control signals; and control means for responding to said control signals and for controlling and coordinating said receiving means, said video decoder, said analog-to-digital convertor, said horizontal compressor, said memory storage unit, said vertical compressor, and said communication means.

10. A video capture circuit of claim 9 wherein said memory storage unit is a two-line line buffer.

11. A video capture circuit of claim 9 wherein said horizontal compressor and said vertical compressor each has a plurality of selectable operating modes, one of said plurality of operating modes passing said video signal without compressing said video signal.

12. A video capture circuit of claim wherein said first quantity of said second component signals corresponds to a line of a frame of a video image.

13. A video capture circuit of claim 9 wherein said second quantity of said compressed second component signals corresponds to at least two lines of a frame of a video image.

* * * * *